(12) United States Patent
Kawasaki et al.

(10) Patent No.: US 7,724,379 B2
(45) Date of Patent: May 25, 2010

(54) 3-DIMENSIONAL SHAPE MEASURING METHOD AND DEVICE THEREOF

(75) Inventors: Hiroshi Kawasaki, Saitama (JP); Ryo Furukawa, Hiroshima (JP)

(73) Assignee: Technodream21, Inc., Saitama (JP)

( * ) Notice: Subject to any disclaimer, the term of this patent is extended or adjusted under 35 U.S.C. 154(b) by 116 days.

(21) Appl. No.: 11/920,265

(22) PCT Filed: May 12, 2005

(86) PCT No.: PCT/JP2005/009116

§ 371 (c)(1),
(2), (4) Date: Nov. 13, 2007

(87) PCT Pub. No.: WO2006/120759

PCT Pub. Date: Nov. 16, 2006

(65) Prior Publication Data

US 2009/0097039 A1    Apr. 16, 2009

(51) Int. Cl.
*G01B 11/24* (2006.01)
(52) U.S. Cl. .................................................. 356/603
(58) Field of Classification Search ......... 356/601–603, 356/606; 345/420; 382/154
See application file for complete search history.

(56) References Cited

U.S. PATENT DOCUMENTS

| | | | |
|---|---|---|---|
| 6,055,056 A * | 4/2000 | Kuehmstedt et al. ........ 356/601 |
| 6,441,888 B1 | 8/2002 | Azuma et al. | |
| 6,542,250 B1 * | 4/2003 | Michaelis et al. ........... 356/601 |
| 6,549,288 B1 * | 4/2003 | Migdal et al. ............... 356/603 |
| 6,937,348 B2 * | 8/2005 | Geng ......................... 356/603 |
| 7,061,628 B2 * | 6/2006 | Franke et al. ............... 356/604 |
| 7,286,246 B2 * | 10/2007 | Yoshida ..................... 356/605 |
| 2001/0037191 A1 | 11/2001 | Furuta et al. | |
| 2005/0002559 A1 | 1/2005 | Terauchi et al. | |

OTHER PUBLICATIONS

Fofi et al., "Uncalibrated Vision Based on Structured Light," ICRA, 3548-3553 (2001).

* cited by examiner

*Primary Examiner*—Tarifur R. Chowdhury
*Assistant Examiner*—Isiaka Akanbi
(74) *Attorney, Agent, or Firm*—Oliff & Berridge PLC

(57) ABSTRACT

It is possible to measure a 3-dimensional shape by using a projector and an imaging device without requiring calibration in advance. A pattern light is applied from a projector to an object and this is imaged by an imaging device to capture an image as an input. An in-camera parameter, an in-projector parameter, a parameter of positional relationship between the camera and the projector are estimated. By using the estimation results, a 3-dimensional shape of the object is measured. When a laser pointer is attached to the projector and a laser is applied to the object for capturing an image as an input, scaling of the object shape can also be estimated. Moreover, when measuring a plurality of objects or measuring the same objects a plurality of times, the accuracy of the 3-dimensional shape respectively obtained can be increased by simultaneously processing the inputs. Moreover, when one of projector and the camera is fixed and the other is moved while measuring the same object a plurality of times, the accuracy of the 3-dimensional shape obtained as a result can be increased by performing bundle adjustment.

22 Claims, 15 Drawing Sheets

Rotation table markers

3-DIMENSIONAL SHAPE MEASURING METHOD AND DEVICE THEREOF

BACKGROUND

The present invention relates to a measuring apparatus for capturing the structured light, which is emitted to a target object by a pattern projector, by an image capturing device and estimating a 3D shape from the captured image by the principle of triangulation, and more particularly to a 3D shape measuring apparatus which does not have the need for previously measuring the positional relationship between the pattern projector and the image capturing device.

3D acquisition stereo systems can be categorized into two basic types: a passive stereo system and an active stereo system. The former can recover 3D shapes only from multiple images. Therefore, no special devices are necessary, and the systems are usually easy to use and convenient. However, in order to recover 3D shapes from images by passive stereo, eliminating errors for searching correspondences between images is generally difficult. Furthermore, candidates for correspondence points are usually limited to feature points on the images. Thus, interpolation is necessary to recover dense 3D points and the accuracy of the data except feature points may be unreliable.

Active stereo systems, on the other hand, utilize light projectors or laser projectors for scanning, and thus can measure 3D shapes with high precision, having no need to solve correspondence problems. In addition, dense 3D points can easily be captured in those systems by scanning lasers or by using structured light methods. Therefore, in many cases, active 3D measurement systems are adopted for scanning shapes of objects with complicated shapes.

One of the disadvantages of the active stereo systems is that these systems usually require special devices. For example, there are high precision and efficient active 3D scanners, which are equipped with servo actuators for controlling a laser projecting device. However, there is a problem in that the equipment usually becomes complex and expensive because of the necessity for accurate control of motors and so on. Also, a structured light projecting system using special light projectors are utilized, which are usually expensive.

Recently, low-cost video projectors for computers are commonly available, and it is possible to construct a practical scanning system easily based on active vision technique using those devices. Among those systems, a structured light projection method (coded structured light method) is widely used because of several advantages. For example, it can retrieve dense 3D points in a short period of time because of relatively short scanning time, and a commercially available video projector can be used, thus, there is no need for special devices such as servo motors for scanning process. Documents 1 to 5 describe examples of the researches for a structured light projection method.

Another disadvantage of active stereo systems is that calibration is required between the camera and the projector each time the conditions of the system are changed. Especially for the system based on a structured light projection method, with which a light projector and a image sensor are apart, a precalibration is required each time the system is moved, and this significantly compromises the convenience of the system. If the extrinsic calibration process can be eliminated from an active stereo system, the system can be specified and the biggest problem for active 3D scanners would be solved, thus, the system would be more practical.

Much research has been conducted based on applying self-calibration methods for passive stereo to active stereo systems by substituting a projector for one camera of the stereo paired cameras, e.g., the projector described in Document 6. However, these method are for 3D shape reconstruction in a projective space, and it is not a practical system, because many impractical assumptions are required for Euclidean reconstruction in those systems, such as an affine camera model or a plane in the scene which should be captured by the camera.

Document 1: J. Batlle, E. Mouaddib and J. Salvi "Recent progress in coded structured light as a technique to solve the correspondence problem: a survey", Pattern Recognition, 31, 7, pp. 963-982, 1998

Document 2: D. Caspi, N. Kiryati and J. Shamir "Range imaging with adaptive color structured light", IEEE Trans. on Patt. Anal. Machine Intell. 20, 5, pp. 470-480, 1998

Document 3: K. L. Boyer and A. C. Kak "Color-encoded structured light for rapid active ranging", IEEE Trans. on Patt. Anal. Machine Intell., 9, 1, pp. 14-28, 1987

Document 4: S. Inokuchi, K. Sato and F. Matsuda "Range imaging system for 3-D object recognition", ICPR, pp. 806-808, 1984

Document 5: O. Hall-Holt and S. Rusinkiewicz "Stripe boundary codes for real-time structured-light range scanning of moving objects", In. Conf. Computer Vision, Vol. 2, pp. 359-366, 2001

Document 6: D. Fofi, J. Salvi and E. M. Mouaddib "Uncalibrated vision based on structured light", ICRA, pp. 3548-3553, 2001

SUMMARY

In this invention, a 3D reconstruction method using an uncalibrated active stereo vision system is proposed. The method is equivalent to a self-calibration technique for a passive stereo pair with one of the cameras replaced by a projector.

The main difference between a passive and an active stereo system is that the proposed system can capture dense 3D points, whereas the passive stereo system can capture sparse data set. Therefore, the proposed method can achieve a robust self-calibration using dense correspondence points, and achieve a dense 3D reconstruction.

In addition, a simultaneous 3D reconstruction method is proposed, which achieves more robust and precise 3D reconstruction using multiple scanning data that are repeatedly measured to increase accuracies. Also, a method using a simple device to eliminate ambiguity in the scaling of 3D data is provided, which usually can not be solved by uncalibrated 3D reconstruction systems.

DETAILED DESCRIPTION OF EMBODIMENTS

Figure 1:
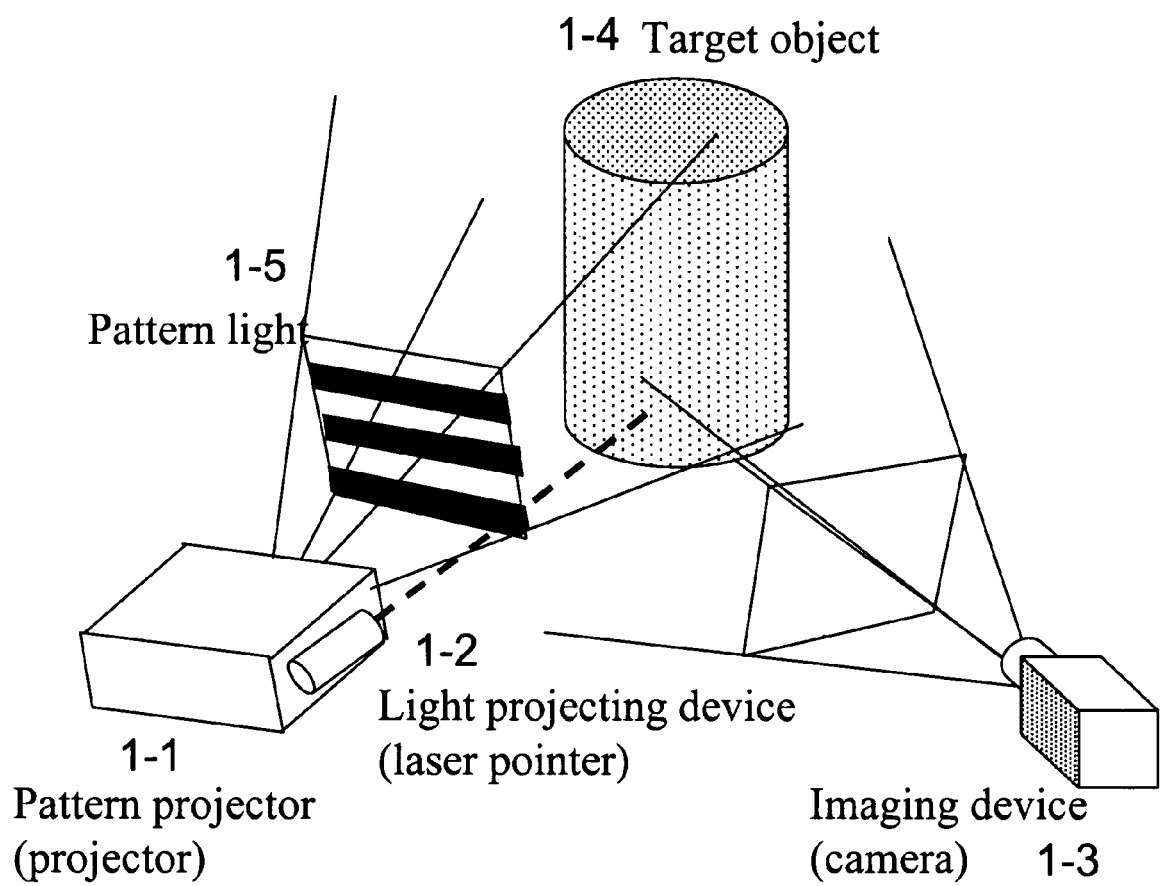
FIG. 1 shows an example of the configuration of the 3D measurement system according to an embodiment.
Figure 2:
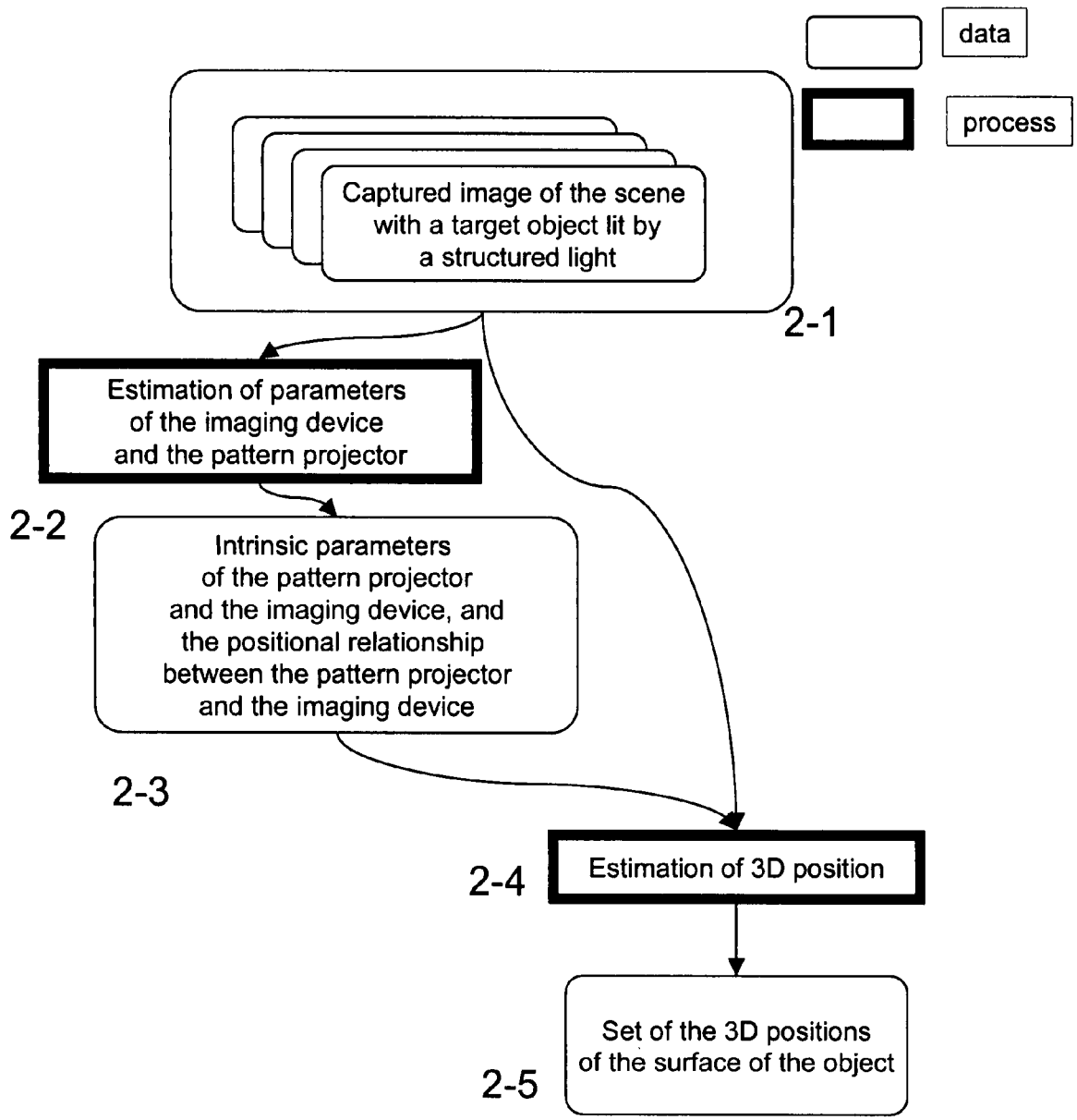
FIGS. 2, 3, 4, 5 and 6 are charts explaining the embodiment.

An embodiment of the present invention will be explained below referring to the drawings.

The configuration of a 3D measuring system of the preferred embodiment will be described. First, FIG. 1 shows an example of the system of a 3D measuring apparatus using the preferred embodiment. In this system, a projector is used as a pattern projector (1-1) and a camera is used as an image capturing device (1-3). The projector has one laser pointer (1-2) fixed thereto as a light projecting device. The laser pointer is used to cause scaling to agree with an actual scale. If it is not necessary to accurately find the scaling of the target object, the laser pointer is not necessary. In measurement, the projector and the camera are directed to a target object and a measurement is started. Images are captured while projecting a plurality of patterns (structured light) to the target object. Further, to determine the scaling of the resultant 3D shape, the image is captured while emitting light from the laser pointer to the target object.

Figure 7:
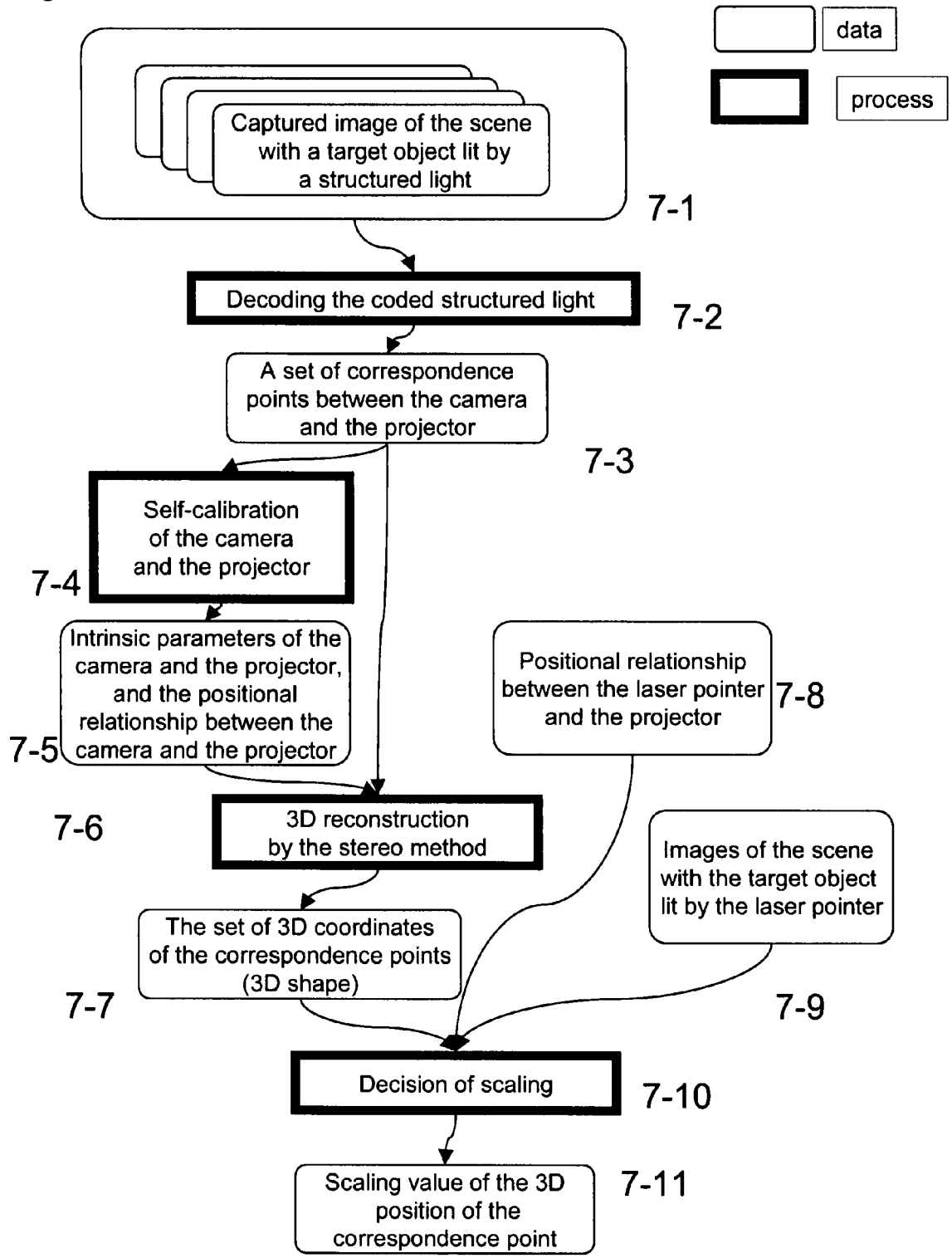
FIG. 7 shows an embodiment of the embodiment.

In the preferred embodiment, the 3D position of points on the surface of the target object are obtained from a set of images captured by the above method. The method will be briefly described referring to FIG. 7. First, a set (7-3) of the correspondence points of the camera and the projector are obtained from the input image (7-1) of the scene to which the structured light is emitted by the decoding (7-2) of the structured light. A parameter (7-5) representing the relative positional relationship between the camera and the projector is estimated from the data by a self-calibration (7-4) method. The 3D position of the correspondence points without actual scaling is obtained (7-7) from the estimated parameter and the set of the correspondence points by a stereo method (7-6). Next, the scaling value is determined (7-10) referring to the image (7-9) obtained by emitting light from the laser pointer to the target object and to the positional relationship (7-8) between the laser pointer and the projector.

3D acquisition system based on the invention has the following features.

The projector and the camera can be located arbitrarily, and calibration for their relative position is not needed in advance for capturing input images.

The system does not assume any limitations in the measured scenes.

The measurement process is completely automatic without any need for user intervention.

A dense depth image is obtained without the ambiguity of scaling.

Figure 8:
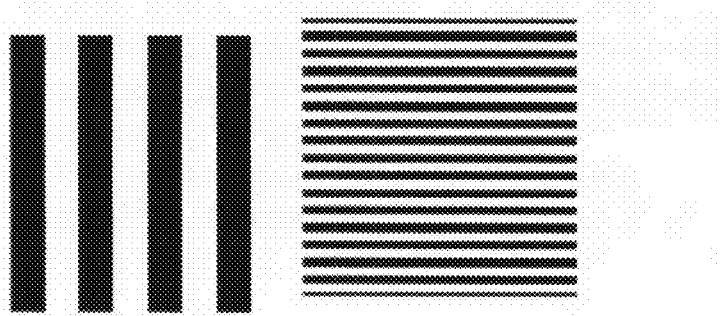
FIG. 8 shows the example of the pattern of a structured light used in the embodiment.
Figure 9:
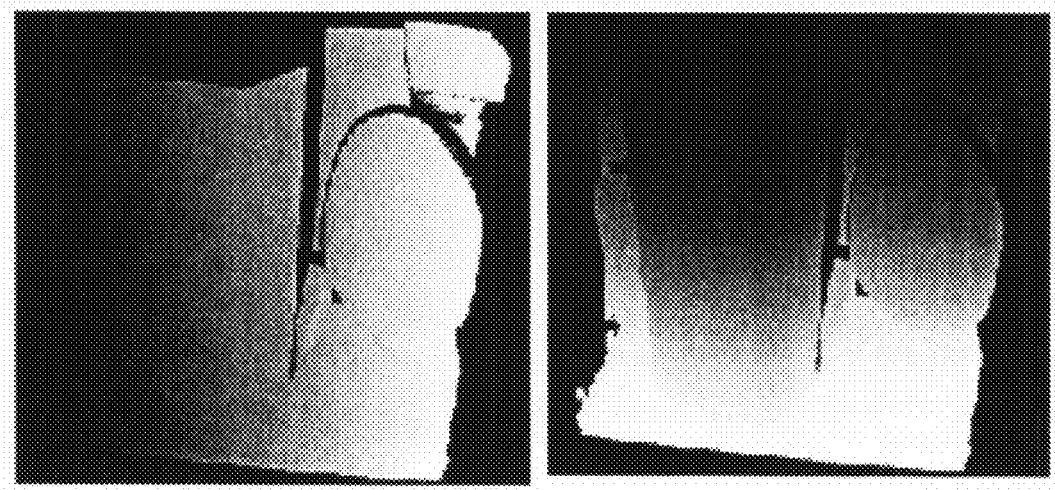
FIG. 9 shows the example input images according to the embodiment while capturing a scene with projecting a pattern of a structured light to the target objects.

The methods to acquire the correspondence points between the projector and the camera in the invention are described. In the invention, a large number of correspondence points are required to acquire a dense shape. For active stereo systems, to acquire a 3D position, a triangulation method using a structured light projection method has been usually conducted. To acquire a large number of correspondence points efficiently, structured light projection methods are proposed (see Documents 1 to 5). In those methods, the position of projected light can be identified by projecting coded patterns on the target object and then decoding the patterns on the captured image. Many correspondence points can be acquired by applying this technique. Therefore, in this embodiment, the correspondences between the camera and the projector using a structured light projection method is also acquired. For example, the gray code pattern method proposed by Inokuchi (Document 4) can be used (FIG. 8), and a point-to-point correspondence can be achieved by projecting the pattern twice; once for the vertical direction and once for the horizontal direction (FIG. 9). Based on this method, a large number of correspondences between the pixel coordinate (u, v) on the captured image and the point coordinate (x, y) on the pattern can be retrieved. Certainly, any other methods can be used based on a structured light.

Next, parameters estimated by the embodiment will be described. In the preferred embodiment, an active stereo system, in which recalibration is not required even if the camera and the projector are arbitrary moved, is constructed. Accordingly, it is necessary to carry out the self-calibration of camera parameters, in particular, extrinsic parameters from measured data. In the preferred embodiment, the intrinsic parameters and the extrinsic parameter of the camera and the projector can be estimated. A part of the intrinsic parameters may be known.

An embodiment, in which the intrinsic parameters of the camera are known and the focal length of the intrinsic parameters of the projector is not known, will be explained as an embodiment. This is an important embodiment in practical use because, although the intrinsic parameters of the camera can be relatively simply and accurately obtained from many existing methods, a method of obtaining the intrinsic parameters of the projector is not so common, and the focal length of the projector is moved more often than that of the camera in measurement.

A method of self-calibration and 3D reconstruction method will be disclosed as to the above embodiment.

Figure 10:
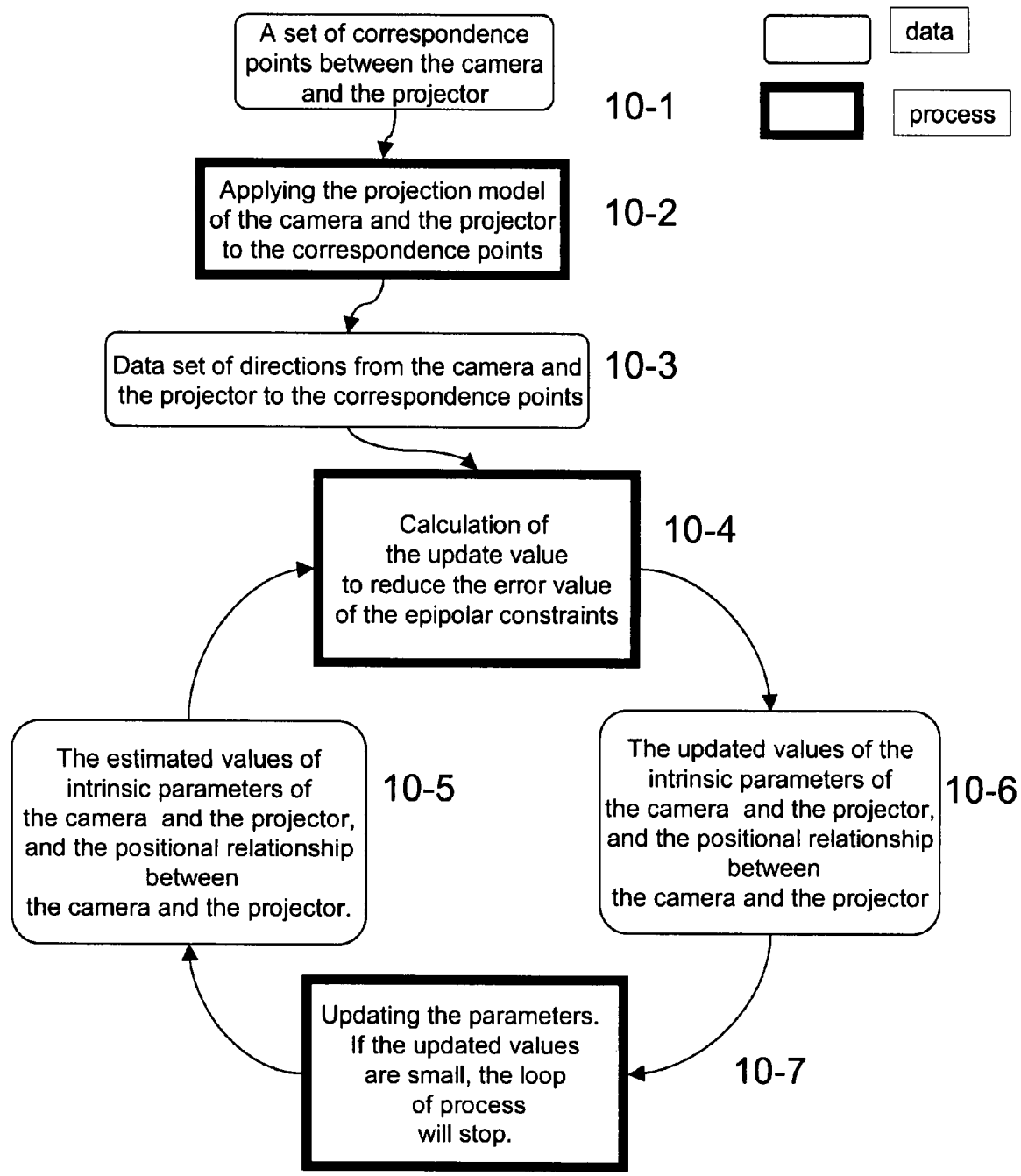
FIG. 10 shows the self-calibration algorithm, which is a part of the 3D reconstruction process, to calibrate the relative position of the camera and the projector, and the intrinsic parameters of the camera and the projector.

In this embodiment, the self-calibration of the respective parameters is carried out by a non-linear optimization such as a Newton method. Recently, an increase in the computational cost of non-linear optimization is not a problem due to the improved calculation capacity of computers. Thus, studies are made to reconstruct a 3D shape by a non-linear optimization from the beginning. This approach can be also used in the preferred embodiment. First, a method of carrying out the self-calibration of the positional relationship between the camera and the projector will be briefly explained referring to FIG. 10.

When the projection model of the camera and the projector is applied (10-2) to the set (10-1) of the correspondence relations between the camera and the projector, a set (10-3) of the directions from the camera and the projector to the correspondence points is obtained. These corresponding points, the camera, and the projector satisfy epipolar constraint.

Here, an error function, which is minimized when the respective correspondence points satisfy the epipolar constraint, is defined using the parameter of the positional relationship between the camera and the projector and the focal length of the projector as inputs. The positional relationship between the camera and the projector is estimated by minimizing the function with respect to the parameter of the positional relationship. Specifically, an update value (10-6), which reduces the error function with respect to the estimated values (10-5) of the positional relationship and the intrinsic parameters, is determined (10-4) by solving a linear equation. The estimated values of the parameters are updated iteratively until an update value becomes small (10-7).

In the following, a method to calculate values for updating the parameters of the relative positions from the set of correspondence points and the estimation of the parameters of the relative positions is described. The camera coordinate is defined as a coordinate system fixed with the camera. Coordinate values expressed in the camera coordinate system are the camera coordinates. The projector coordinate system and the projector coordinates are defined in the same way. The origin of the camera coordinate system (the projector coordinate system) is the optical center of the camera (projector). The forward direction of the camera (projector) is the negative direction of the z-axis of the camera coordinate system (the projector coordinate system). The x and y-axis of the camera coordinate system are parallel with the vertical and horizontal directions, respectively, of the image coordinate system of the screen. The axes of the projector coordinates are defined in the same way.

As already described, in this embodiment, the intrinsic parameters of the camera are assumed to be known, except that the focal length of the camera is assumed to be unknown. Let the focal length of the projector be $f_p$, and the direction vector of the i th correspondence point expressed in the projector coordinates be $$(u_{pi}, v_{pi}, -f_p)^t. \qquad (1)$$

Here, the rigid transformation from the projector coordinates to the camera coordinates is expressed as the rotation matrix $R_p$ and the translation vector $t_p$. The rotation is expressed by the parameters of Euler angles $\alpha_p, \beta_p$ and $\gamma_p$ and the rotation matrix is thus expressed as $R_p(\alpha_p, \beta_p, \gamma_p)$. Since the norm of the translation vector $|t_p|$ cannot be resolved only from the correspondence points, $t_p$ is assumed to be an unit vector and is expressed by two parameters of polar coordinates $(\rho_p, \phi_p)$. Thus, $t_p$ expressed by polar coordinate is represented by $t_p(\rho_p, \phi_p)$.

The coordinate of the i th correspondence point observed by the camera is converted to the screen coordinates of a normalized camera after the correction of the effect of the lens distortions. Let the coordinate be expressed as $$(u_{ci}, v_{ci}, -1)^t. \qquad (2)$$

If the epipolar constraints are met, the lines of sights from the camera and the projector to the correspondence point intersect in the 3D space. The line of sight from the projector to the correspondence point is $$r\{R_p(\alpha_p, \beta_p, \gamma_p)\}(u_{pi}/f_p, v_{pi}/f_p, -1)^t + t_p(\rho_p, \phi_p) \qquad (3)$$

in the camera coordinates, where r is a parameter. The line from the camera to the correspondence point is expressed as $$s(u_{ci}, v_{ci}, -1)^t \qquad (4)$$

where s is a parameter.

By minimizing the 3D distance between the above two lines (3) and (4), the parameters that confirm the epipolar constraints are estimated. Let the direction vectors of the two lines be expressed as $$p_{ci} := N(u_{ci}, v_{ci}, -1)^t, \; q_{ci}(\theta, f_p) := N\{R_p(\alpha_p, \beta_p, \gamma_p)\}(u_{pi}/f_p, v_{pi}/f_p, -1)^t \qquad (5)$$

where N is an operator which normalizes a vector (i.e. $Nx := x/|x|$), and $\theta := (\alpha_p, \beta_p, \gamma_p)$ represents a part of the extrinsic parameters of the projector. Then, the signed distance between the two lines is $$E_i(\theta, \tau, f_p) := t_p(\tau) \cdot N(p_{ci} \times q_{ci}(\theta, f_p)) \qquad (6)$$

where "·" indicates a dot product, and $\tau := (\rho_p, \phi_p)$ represents the parameters of the translation.

$E_i(\theta, \tau, f_p)$ includes systematic errors whose variances change with the parameters $(\theta, \tau, f_p)$ and the index i of the correspondence points. To achieve unbiased evaluation of the parameters $(\theta, \tau, f_p)$, $E_i(\theta, \tau, f_p)$ should be normalized with respect to the expected variance of the errors. Assuming that the epipolar constraints are met, the distances from the camera and the projector to the reference point is represented by $$D_{ci}(\theta, \tau, f_p) := |t_p(\tau) \times q_{ci}(\theta, f_p)| / |p_{ci} \times q_{ci}(\theta, f_p)|,$$

$$D_{pi}(\theta, \tau, f_p) := |t_p(\tau) \times p_{ci}| / |p_{ci} \times q_{ci}(\theta, f_p)| \qquad (7)$$

By using these distances, the distance $\tilde{E}_i(\theta, \tau, f_p)$ between the two lines normalized with respect to the errors is $$w_i(\theta, \rho, f_p) := \{\epsilon_c D_{ci}(\theta, \tau, f_p) + \epsilon_p D_{pi}(\theta, \tau, f_p) / f_p\}^{-1},$$

$$\tilde{E}_i(\theta, \tau, f_p) := w_i(\theta, \tau, f_p) E_i(\theta, \tau, f_p) \qquad (8)$$

where $\epsilon_c$ and $\epsilon_p$ are the errors intrinsic to the camera and the projector expressed as lengths in the normalized screens. In this embodiment, for example, the pixel sizes measured in the image planes of the normalized cameras can be used as these values. In case that the probability distributions of the errors of the camera and the projector are known in advance, the variances of the distributions can be used. If the differences of the error levels of the camera and the projector are not large, $\epsilon_c$ and $\epsilon_p$ can be set to be the same. Then, the function $f(\theta, \tau f_p)$ to be minimized with the non-linear optimization is expressed as the following form:

$$f(\theta, \tau, f_p) := \sum_{i=1}^{K} \{\tilde{E}_i(\theta, \tau, f_p)\}^2. \qquad (9)$$

where K is the number of the reference points.

The above function can be minimized using the Newton method as the following. It is assumed that the solution of the minimization at the j th iteration is $(\theta_j, \tau_j, f_{p,j})$. Then, $(\theta_j, \tau_j, f_{p,j})$ are updated by the solutions $\Delta\alpha, \ldots, \Delta f$ of the equations $$\frac{\partial \tilde{E}_i}{\partial \alpha_p}\Delta\alpha + \frac{\partial \tilde{E}_i}{\partial \beta_p}\Delta\beta + \frac{\partial \tilde{E}_i}{\partial \gamma_p}\Delta\gamma + \frac{\partial \tilde{E}_i}{\partial \rho_p}\Delta\rho + \frac{\partial \tilde{E}_i}{\partial \phi_p}\Delta\phi + \frac{\partial \tilde{E}_i}{\partial f_p}\Delta f = \qquad (10)$$

$$-\tilde{E}_i(\theta_j, \tau_j, f_{p,j}),$$

$$i = 1, 2, \ldots, K$$

where the partial derivatives $$\frac{\partial \tilde{E}_i}{\partial \alpha_p}, \ldots, \frac{\partial \tilde{E}_i}{\partial f_p}$$

are calculated for $\theta=\theta_j$, $\tau=\tau_j$, $f_p=f_{p,j}$, $(\theta_j,\tau_j,f_{p,j})$. Since $N>6$ (i.e. the number of equations is larger than the number of variables), these equations are generally unsolvable. However, the approximate solutions $\Delta\alpha, \ldots, \Delta f$ that minimize the sum of the squares of the differences of both sides of the equations are calculated using a pseudo-inverse matrix. By updating the estimated values using the following forms iteratively, the target function can be minimized.

$$\theta_{j+1}=\theta_j+(\Delta\alpha,\Delta\beta,\Delta\gamma), \tau_{j+1}=\tau_j+(\Delta\rho,\Delta\phi), f_{p,j+1}=f_{p,j}+\Delta f. \quad (11)$$

Since $q_{ci}$ depends on $\alpha_p$ and $t_p$ does not depend on $\alpha_p$, $$\frac{\partial \tilde{E}_i}{\partial \alpha_p}$$

is calculated as $$\frac{\partial \tilde{E}_i}{\partial \alpha_p} = w_i(\theta, f_p) t_p \cdot \left\{ \frac{\left(p_{ci} \times \frac{\partial q_{ci}}{\partial \alpha_p}\right)_{\perp(p_{ci} \times q_{ci})}}{\|p_{ci} \times q_{ci}\|} \right\} \quad (12)$$

where $x_{\perp y}$ represents component of vector $x$ that is vertical to vector $$y \text{ (i.e., } x_{\perp y} := x - (x \cdot y)y/\|y\|^2\text{)}. \frac{\partial \tilde{E}_i}{\partial \beta_p} \frac{\partial \tilde{E}_i}{\partial \gamma_p} \frac{\partial \tilde{E}_i}{\partial f_p}$$

can also be calculated similarly. Since $t_p$, depends on $\rho_p$ and $q_{ci}$ does not depend on $\rho_p$, $$\frac{\partial \tilde{E}_i}{\partial \rho_p}$$

is calculated as $$\frac{\partial \tilde{E}_i}{\partial \rho_p} = \frac{\partial w_i}{\partial \rho_p} E_i + w_i(\theta, f_p) \left(\frac{\partial t_p}{\partial \rho_p}\right) \cdot N(p_{ci} \times q_{ci}). \quad (13)$$

$$\frac{\partial \tilde{E}_i}{\partial \phi_p}$$

can also be calculated similarly.

Let the N×6 coefficient matrix of the simultaneous linear equations that are formed by equations (10) be M. The stability of the solutions of these simultaneous equations can be evaluated from the ratio $\lambda_{min}/\lambda_{max}$ of the maximum singular value $\lambda_{max}$ to the minimum singular value $\lambda_{min}$ of M, which can be considered as an estimate of the "strength of the linear independency" of 6 column vectors of M.

The equation (13) tells that, when the normal vectors N ($p_{ci} \times q_{ci}$) of epipolar planes have a small variance, the linear independence of the column vectors of M is weak, thereby the stability of the solution is deteriorated. This corresponds to a case in which the vertical angle of view of a scene from the camera or the projector is small while the projector is placed beside the camera.

Figure 11:
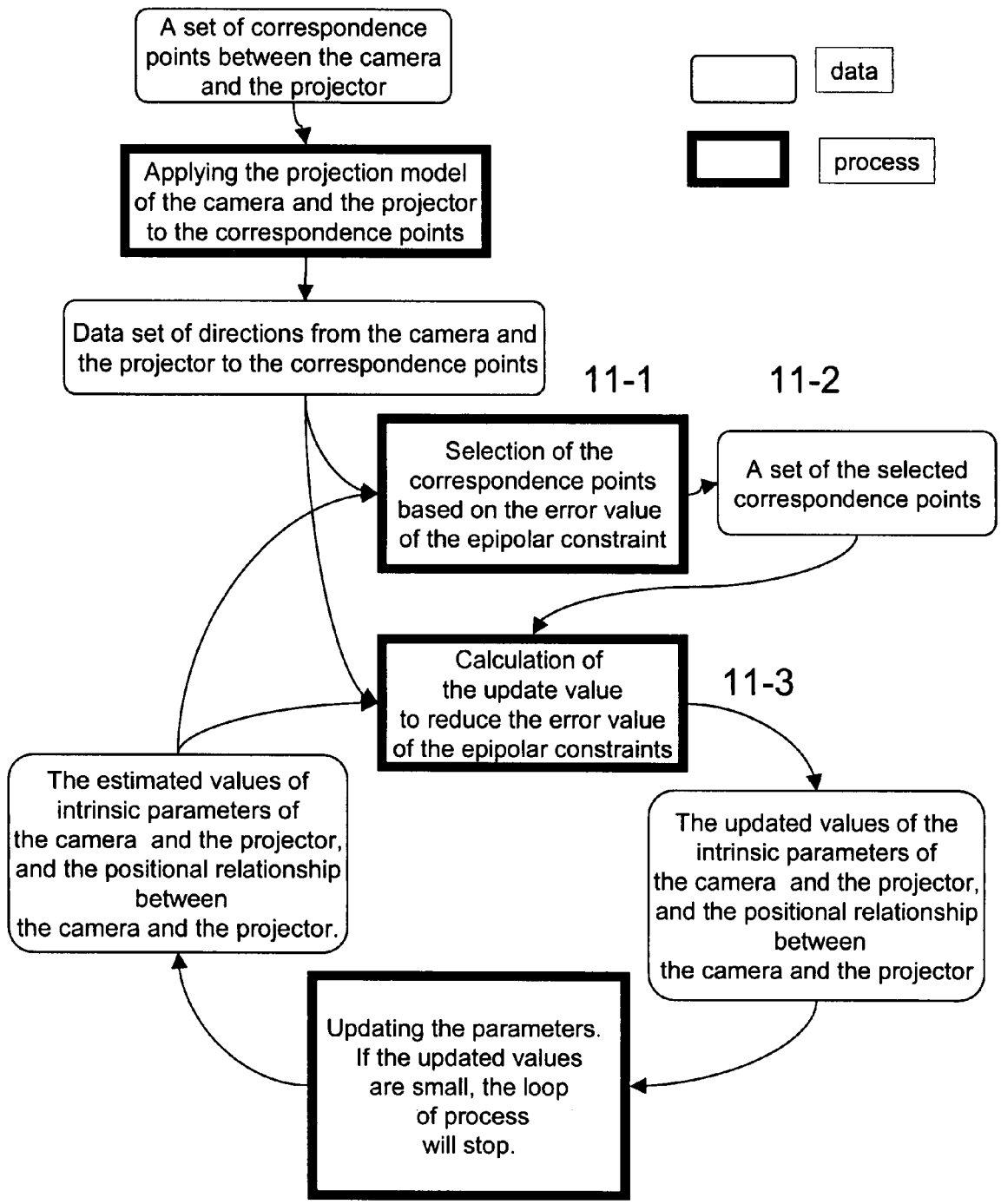
FIG. 11 shows the extended self-calibration algorithm shown in FIG. 5, which becomes more robust for errors.

In the reconstruction achieved by minimizing the evaluation function of the equation (9), when a particularly large error of $(u_{pi}, v_{pi}, -f_p)^t$ and $(u_{ci}, v_{ci}, -1)^t$ is included (outliers exist), the reliability of the estimated parameters may be deteriorated. As a reconstruction method having high robustness to a small number of outliers, it is effective to use only the error having a relatively small value of the error $\tilde{E}_i(\theta_j, \tau_j, f_{p,j})$ to determine the update values $\Delta\alpha, \ldots, \Delta f$ (FIG. 11). For this purpose, it is sufficient to employ only the equation having a small value of $\tilde{E}_i(\theta_j, \tau_j, f_{p,j})$ instead of employing all the equations of $i=1, 2, \ldots, K$ in the simultaneous equations (10). In an example of implementation carried out by this method, the update values of the parameters $\Delta\alpha, \ldots, \Delta f$ are determined (11-3) by sorting all the corresponding points in an ascending order as to the absolute values of the errors $\tilde{E}_i(\theta_j, \tau_j, f_{p,j})$, selecting the corresponding points having the order within 90% from the beginning (11-1), and solving the simultaneous equations about the correspondence points (11-2) selected from the simultaneous equation (10).

In the above robust reconstruction method, when the parameters $(\theta_j, \tau_j, f_{p,j})$ are converged using only the correspondence points having the order within 90% from the beginning, the stability of convergence may be deteriorated. As a countermeasure to it, the reconstruction may be carried out by applying the above robust reconstruction method after the values $(\theta_j, \tau_j, f_{p,j})$ are updated first until they are converged using all the correspondence points.

Further, when the rate of the outliers is high, robustness can be enhanced when the rate of the correspondence points to be used is reduced. At the time, the stability of convergence may be enhanced by using all the correspondence points at the beginning, and thereafter gradually reducing the rate of the correspondence points to be used to 90%, 80%, and the like.

When the focal length $f_p$ of the projector is included to the parameters to be estimated, the stability of convergence may be deteriorated in optimization. In this case, convergence may be stably obtained by fixing the focal length $f_p$ of the projector first, carrying out optimization only with respect to the extrinsic parameters, and, after the convergence is obtained, carrying out optimization by including $f_p$ to variables.

Further, in the case the focal length $f_p$ of the projector is accurately determined previously, the accuracy of a final solution can be enhanced when $f_p$ is used as a fixed parameter until the end and is not used for the optimization.

When the information such as whether the projector is located on the right side or the left side of the camera is obtained as an assumption, the information is preferably used as the initial value of the extrinsic parameters. When the projector is located on the left side of the camera (shown in FIG. 1) viewed from the camera and the projector to the direction of the target object, it is preferable to use the initial value of a rotation matrix $R_p$ as a unit matrix and to set the initial value of a translation vector $t_p$ to $(-1, 0, 0)$. On the contrary, when the projector is located on the right side of the camera, it is preferable to set the initial value of $t_p$ to $(1, 0, 0)$.

Further, when the angles of the projector and the camera can be roughly known, they are given as the initial values of Euler angles.

A 3D shape can be directly restored by applying the estimated parameters $t_p$ and $R_p$ to the stereo method.

Since the ambiguity of scaling can not be decided by self-calibrating stereo methods, several problems occur in practical use. One of the problems is that, when we scan an object from various view directions to capture its entire shape, scaling parameters are different for each view directions. In this invention, two solutions are proposed for this problem: the first solution is keeping the consistent scaling factors for multiple scans by estimating camera parameters simultaneously from the scans, and the second is a method to decide real scaling by using a laser pointer attached to the projector.

First, the first solution to keep the consistent scaling for multiple scans with simultaneous 3D reconstruction method is explained.

Figure 12:
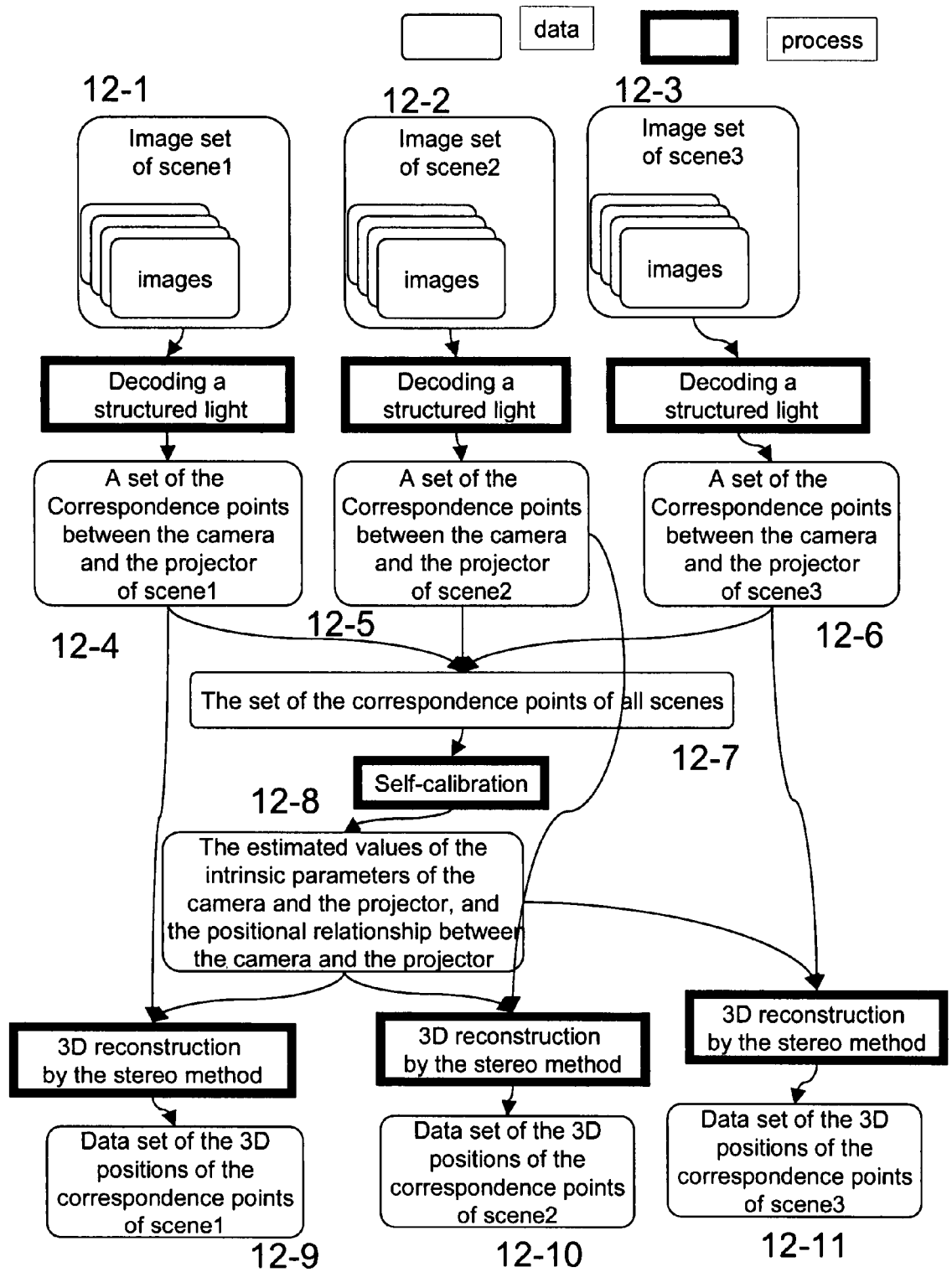
FIG. 12 shows the algorithm of simultaneous reconstruction method in order to improve the accuracy of the reconstructed shape acquired by the multiple measurements while moving the target object with the camera and the projector fixed.
Figure 13:
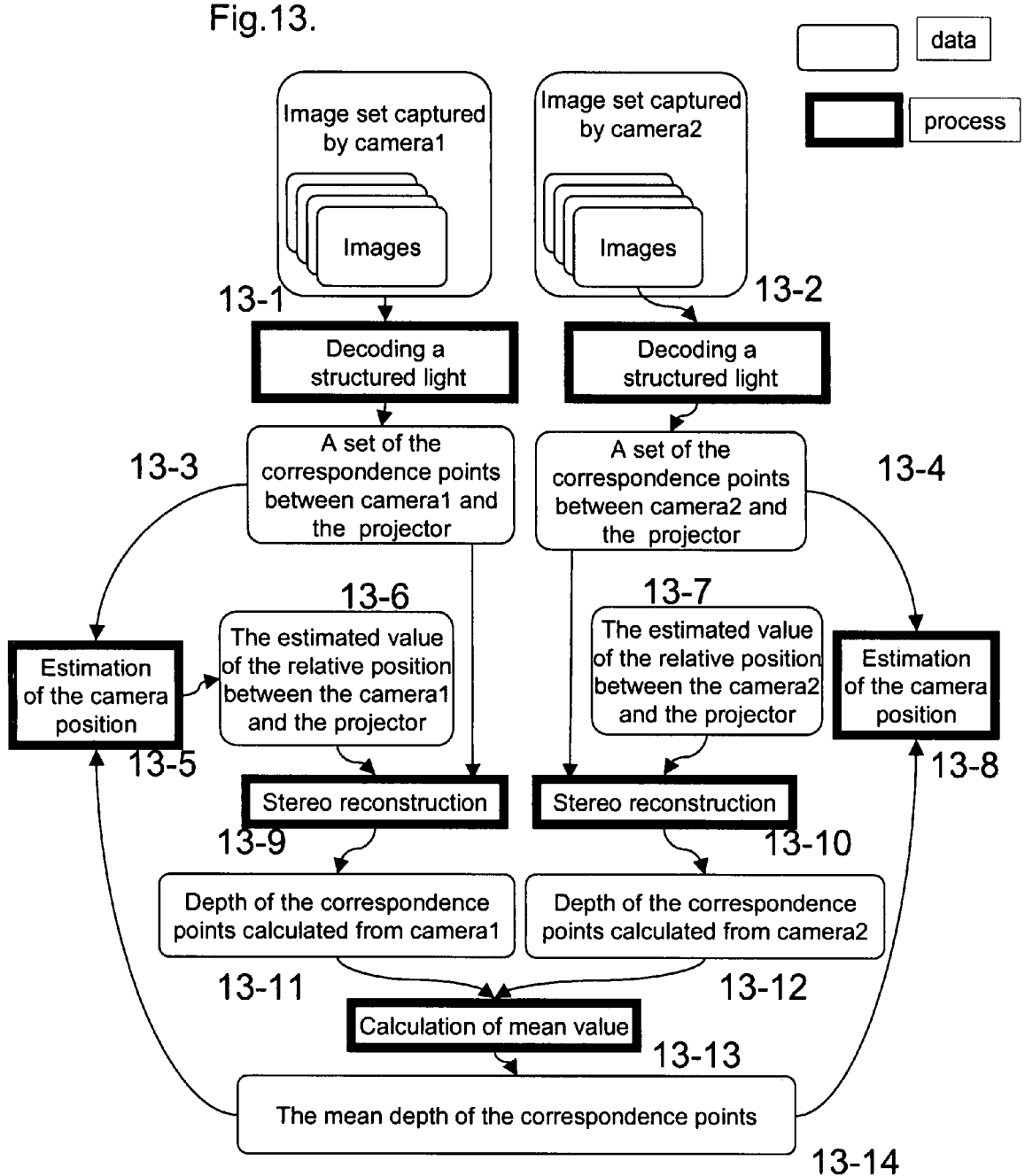
FIG. 13 shows the algorithm of bundle reconstruction method in order to improve the accuracy of the reconstructed shapes acquired by measuring the same scene while moving the camera with the projector fixed.

In this invention, "simultaneous 3D reconstruction" means the process of camera parameter estimation and 3D reconstruction simultaneously using inputs of multiple views. The outline of the simultaneous 3D reconstruction is described in the following, using FIG. 12. Here, it is assumed that the target object can be movable. First, multiple scenes are captured by keeping both the camera and projector fixed. The intrinsic and extrinsic parameters of the camera and the projector are identical for all the captured data (12-1, 12-2, and 12-3). Therefore, by applying the self-calibration algorithm described above to the aggregated set (12-7) of correspondence points (12-4, 12-5, and 12-6) for all the scans, the common parameters (12-8) of all the scans can be estimated. Then, 3D reconstruction can be performed for each scan using the estimated common parameters (12-9, 12-10, and 12-11).

An advantage of simultaneous reconstruction using data obtained with multiple scanning is that the scaling factors of all the reconstructed scenes become consistent. This is important, especially for registering multiple scanning of an object and integrating them into a single shape.

Another advantage is that it is expected that this method can improve the stability of solving the problem. Generally, one of the reasons for an instability of the solution of uncalibrated 3D reconstruction is that the changes of the observed values ($q_{ci}$ in the case above) with a change of the focal length appears to be similar to the changes of the observed values with a change of the distance between the projector and the scene. Using multiple depth values of corresponding regions of multiple scenes, the differences between those changes will increase and become easily observable, and it is expected that the solution will become more stable. Especially, in the case that target object is nearly planar, measuring the object with only one scan causes an unstable solution. However, the solution is effectively stabilized by scanning the object multiple times while moving the object and processing simultaneous reconstruction.

Next, the method to determine the real scaling parameter for the reconstructed shape by attaching a laser pointer to the projector is explained.

The scaling factor of the reconstructed 3D shape produced by this method is different from the scale of the real shape. The simultaneous reconstruction described in the previous subsection is useful for obtaining multiple reconstructions with constant scaling, but the "real" scaling factor of the scene cannot be determined with the method. To achieve this, the following methods can be applied:

(1) actually measuring the length between specific two points on the target object, (2) measuring an object with a known shape and the target object successively without moving the camera nor the projector, or (3) measuring an object with a known shape and the target object simultaneously.

However, all of these techniques normally require some human intervention of measuring scenes and make it difficult to develop a completely automatic measuring process.

In this embodiment, a method is proposed, which is for estimating the scale factor by attaching a laser pointer to the projector and observing the reflection of the laser beam on measuring the target object. The laser pointer projects a beam on a line fixed to the projector coordinate system. The parameters of the line of the beam (4-5) should be estimated in advance. To achieve this, multiple points on the laser line are obtained by measuring an object with a known shape lit by the laser pointer. Then, the multiple points are represented in the projector coordinates and are fitted to a line to obtain the parameters of the line. This process is required only once when the laser pointer is attached to the projector.

To determine a scaling factor of a target object (4-3), the laser beam is projected on measuring the scene and the point lit by the laser is detected (4-4) by the camera. Let the 3D location (4-3) estimated up to scale be $(x_{pm}, y_{pm}, z_{pm})^t$ in the projector coordinates. The real 3D coordinates of the point can be expressed as $\lambda(x_{pm}, y_{pm}, z_{pm})^t$, where $\lambda$ is the scaling multiplier. If we regard $\lambda$ as a parameter, points represented by the above form define the line that passes both the origin of the projector coordinate system and the point $(x_{pm}, y_{pm}, z_{pm})^t$. The point marked by the pointer is on the calibrated light beam of the laser pointer; thus, by taking the cross point of the line $\lambda(x_{pm}, y_{pm}, z_{pm})^t$ and the calibrated light beam of the laser pointer, the unknown scaling parameter $\lambda$ (4-7) can be decided.

Figure 18:
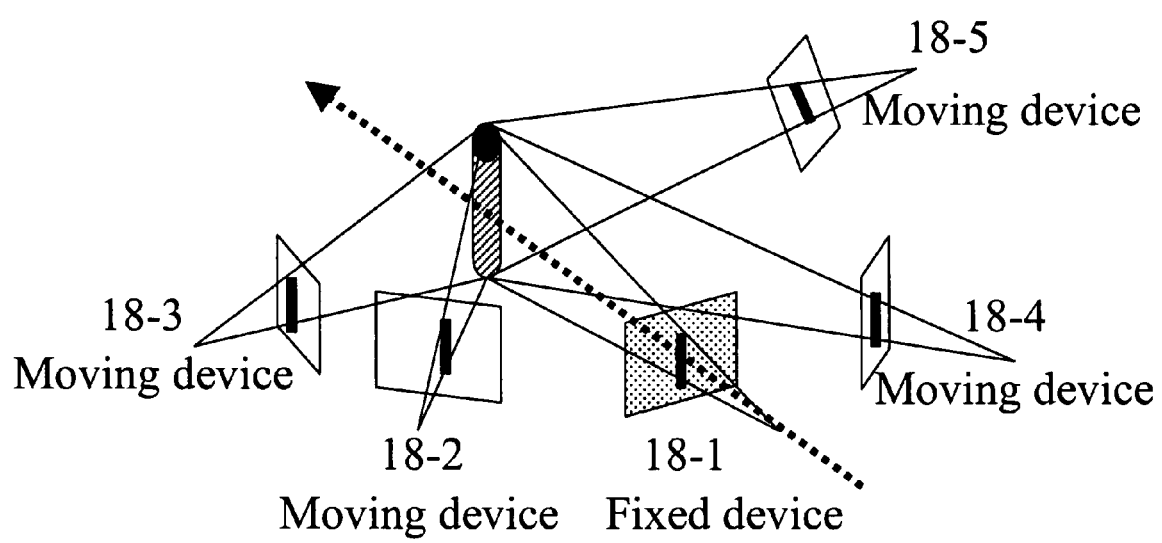
FIG. 18 shows a measurement condition while one device is fixed and the other is moved.

Next, a method of carrying out 3D measurements of a still target object a plurality of times while fixing one of the projector and the camera and moving the other of them and representing the 3D shapes obtained by the respective measurements in the same coordinate system will be described (FIG. 18).

In the 3D measurement method of the embodiment, the relative position between the projector and the camera need not be measured previously and it is possible to conduct a measurement while moving the devices. At the time, the measurement is carried out a plurality of times while fixing any one of the projector and the camera (18-1) and moving the other of them (18-2, 18-3, 18-4, 18-5). Then, 3D shapes can be obtained as to the respective measurements. Here, it is assumed that all of these 3D shapes are represented by the coordinate system of the fixed device. Referring the explanatory figure, the measurements are carried out between (18-1) and (18-2) and between (18-1) and (18-3), then, all the shapes obtained by these measurements are represented on the coordinate system of the device (18-1). Thus, all the results of the plurality of measurements are represented on the same coordinate system. Although the result of these measurements does not have a common scaling factor, scalings can be made consistent each other by taking out one or a plurality of points from the common region of the result of measurements and comparing the depths to the points in the coordinate system of the device (18-1).

One of the advantages of the method is that a defect caused to the result of measurements by occlusion can be suppressed by covering the defect by the plurality of measurements.

When the still target object is measured while fixing one of the projector and the camera and moving the other of them as described above, the accuracy of the result of measurement can be enhanced by a method called a bundle adjustment method. A simple bundle adjustment method will be described below.

Using the 3D reconstruction method based on the self-calibration and the stereo method that is already described, it is sometimes hard to obtain a result with high precision even if a sufficiently large number of correspondence points are provided. One example is the case when the distance from the camera or projector to the target object are relatively large compared to the variation of depth of the scene, which means that the projection of the scene to the devices are nearly pseudo-perspective projections. Assuming pseudo-perspective projections, self-calibration using correspondences between only two images is impossible. Similarly, in the case that the projections are nearly pseudo-perspective, the solution gets unstable even with a sufficient number of correspondence points. Sometimes, the problem of unstableness can be alleviated by increasing the depth variation of the scene using the simultaneous 3D reconstruction that is already descried. However, this approach is sometimes hard to apply when the depth of focus is shallow. For these cases, using three or more camera images can stabilize the solution, since 3D reconstruction from three or more images is possible even on the condition of pseudo-perspective projections.

Figure 3:
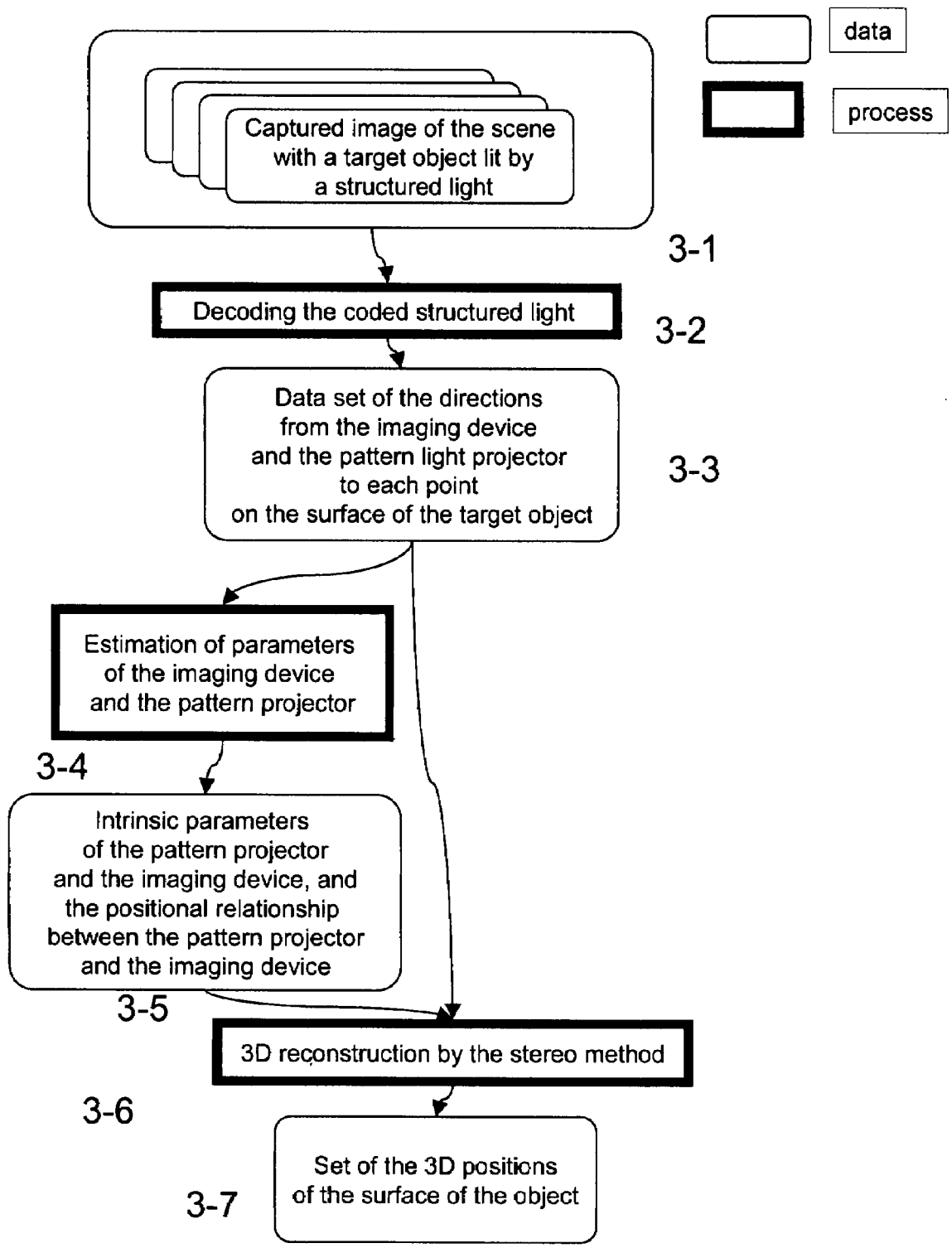
Figure 4:
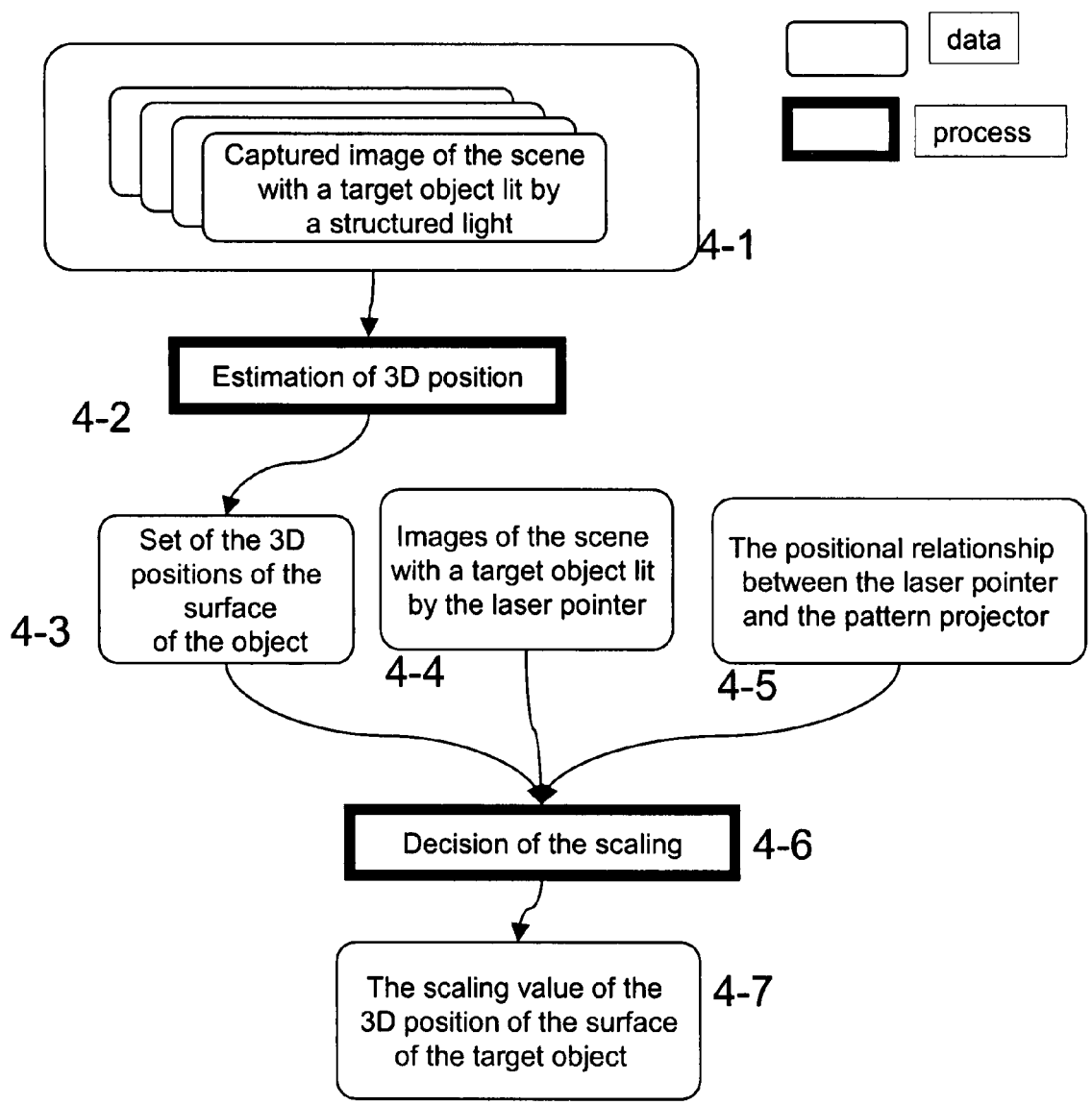
Figure 5:
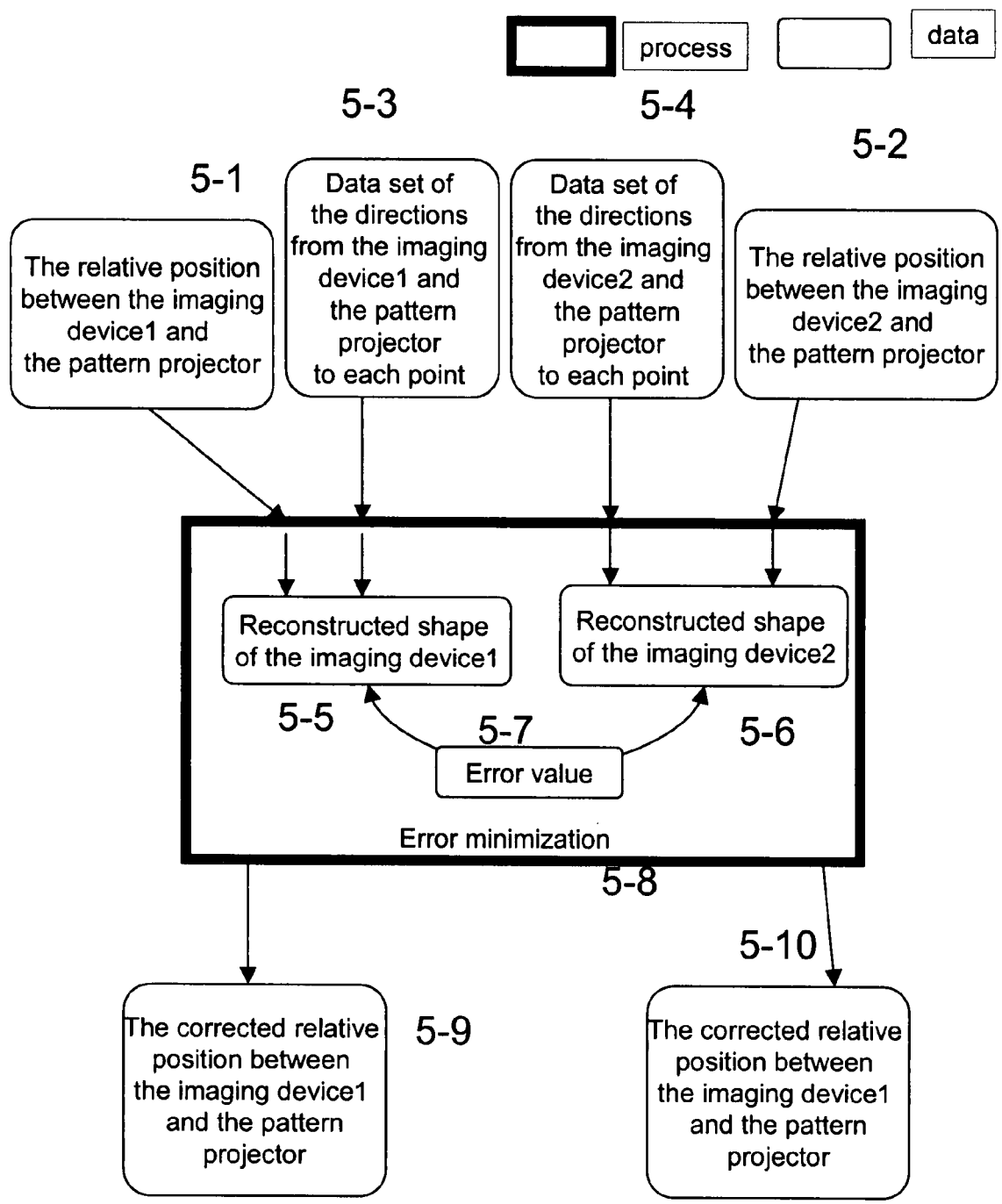
Figure 6:
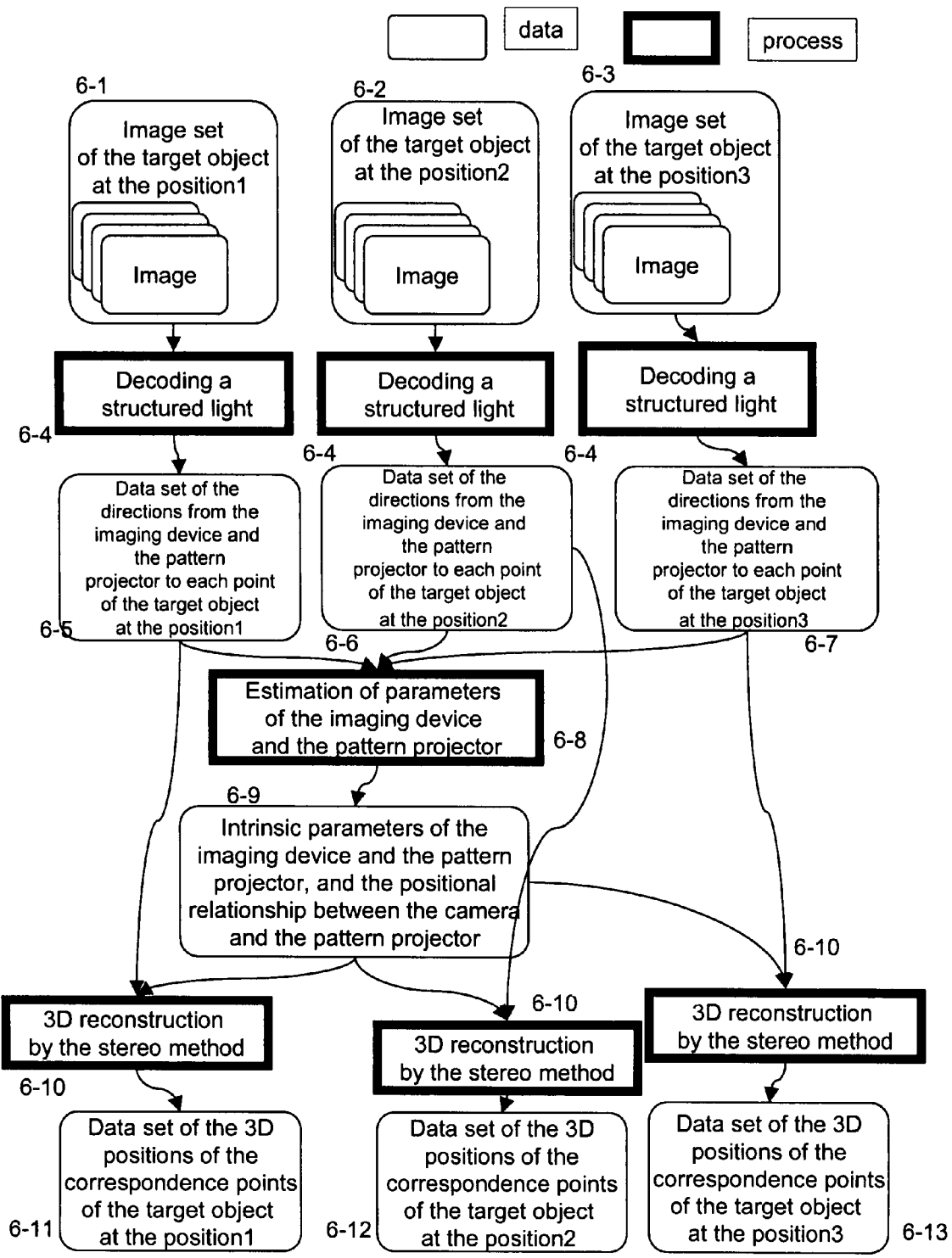

It is considered to carry out measurements a plurality of times while fixing one of the projector and the camera and moving the other of them (shown in FIG. 18). A result of self-calibration of the extrinsic parameters can be improved from the set by the simple bundle adjustment. As a result, the accuracies of the plurality of 3D reconstruction results measured by the above method can be enhanced. A procedure of the bundle adjustment carried out when an image is captured while fixing the projector and moving the camera will be explained below referring to FIG. 3. The same procedure is carried out when the camera is moved.

To process a bundle adjustment, reference points (13-3, 13-4) that are commonly observable from all the cameras and the projector are selected by sampling. The 3D locations of the reference points and the extrinsic parameters of all the cameras are estimated by the following processes. Let the estimated depth (13-11, 13-12) of the j th reference points (in the projector coordinates) observed from the projector be expressed as $d_i$ (i=1, 2, . . . , $N_r$) where $N_r$ is the number of the reference points, and the extrinsic parameters (13-6, 13-7) of the camera j be expressed as $\theta_j$. For the initial values of these values, the result of the self-calibration and the 3 D reconstruction method that are already described are used. The algorithm of the bundle adjustment is as follows.

Step 1

Sample 3D points (13-3, 13-4) that are commonly observable from all the camera and the projector as reference points.

Step 2

The initial positions of the reference points are calculated by self-calibration and the 3D reconstruction using one of the cameras and the projector.

Step 3

Repeat the following steps until the changes of $\theta_j$ become sufficiently small.

Step 3.1

Repeat the following steps for all the camera indexes j=1, 2, . . . , $N_c$.

Step 3.1.1

Update the extrinsic camera parameters $\theta_j$ (13-6, 13-7) of the camera j, using the current estimation of the depths $d_i$ (i=1, 2, . . . , $N_r$) (13-14) of the reference points from the projector.

Step 3.2

Update $d_i$ (i=1, 2, . . . , $N_r$) using the current $\theta_j$.

The update process of the camera parameter $\theta_j$ is as the followings. Let the coordinates of the point represented in the projector coordinate system transformed from the coordinates of the 3D point x in the camera coordinate system using the extrinsic parameters $\theta_j := \alpha_{c,j}, \beta_{c,j}, \gamma_{c,j}, t_{c,j}$ of the j th camera be Trans($\theta_j$, x). Let the mapping of the projection by the standard camera be Proj.

By minimizing $$Q(\theta_j) := \sum_{i=1}^{N_r} \|Proj(Trans(\theta_j, u_{pi}d_i/f_p v_{pi}d_i/f_p - d_{pi})^t) - (u_{ci,j}v_{ci,j})^t\|^2$$

with respect to $\theta_j$, the extrinsic parameters of the j th camera can be estimated (13-5, 13-8). The minimization process is the same problem with a normal camera calibration problem from 3D-2D correspondences. The problem can be solved by, for example, the Newton method. Other non-linear optimization, such as a simplex descendent method, can also be used. The initial estimation for the problem can be obtained by a linear method proposed for camera calibrations.

Update of the estimated depths of the reference points $d_i$ (i=1, 2, . . . , $N_r$) (13-14) from the projector is processed as the followings. The reference points are reconstructed and the depth values from the projector to the reference points are calculated from the correspondence points between the projector and each of the cameras using the temporal estimation of the extrinsic parameters. Then, the new reference points are calculated by averaging the depth values calculated for all the cameras. This process is carried out as follows.

Step 1

Repeat the following steps for each camera index j=1, 2, . . . , $N_c$

Step 1.1

Calculate the distances (13-11, 13-12) between the projector and the reference points from the correspondence points (13-3, 13-4) between the projector and the j th camera, and the extrinsic parameters $\theta_j$ (13-6, 13-7) of the j th camera. The outputs of the calculation are depths $d_{k,j}$ (13-11, 13-12) from the projector, where k is the index of the reference point.

Step 2

Calculate the averages of the distances (13-14) between the projector and each of the reference points by the form $$d_k = \sum_{j=1}^{N_c} d_{k,j}/N_c.$$

Next, an entire shape estimation method in the embodiment will be disclosed.

To obtain the entire shape of a target object, it is necessary to carry out 3D reconstruction measured from respective directions while changing the direction of the target object and to align and integrate the resultant 3D shapes.

At the time, the scalings of the 3D shapes reconstructed for the respective directions can be made consistent to each other and thus the 3D shapes can be aligned easily by measuring the correspondence points from the respective directions while fixing the camera and the projector and changing the direction of the target object, and applying the method of "simultaneous 3D reconstruction of multiple scenes" described above.

In the above method, when a means such as a turntable for changing the direction of the target object is further used to restrict the change in direction thereof to the rotation with respect to a certain axis, the change in direction of the target object can be estimated easily. With this arrangement, a processing for aligning the 3D shapes can be more simplified.

Figure 14:
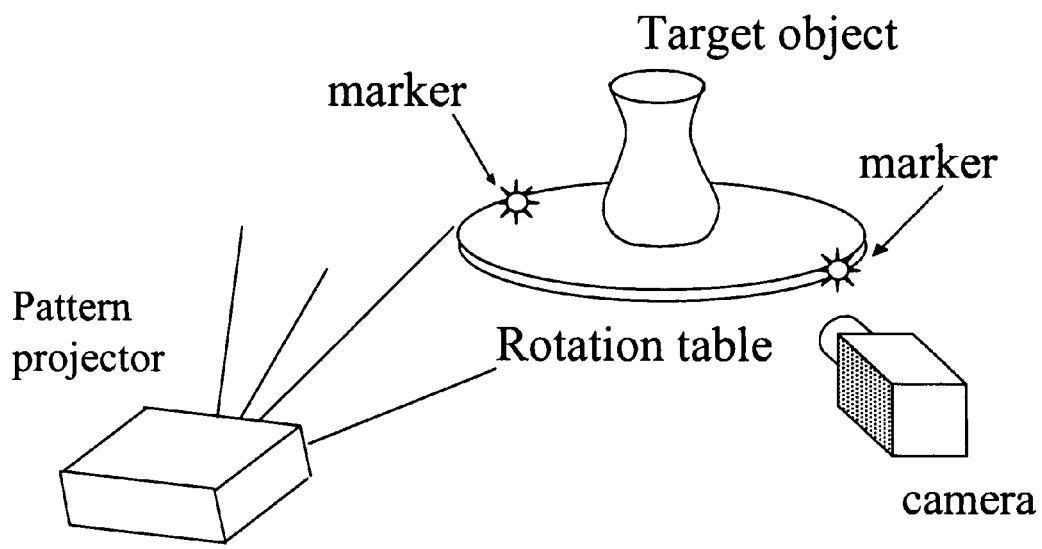
FIG. 14 shows the device, which realizes automatic acquisition of the entire shape by using the rotation table with the markers.

In the above method, when a turntable, which can control an amount of rotation, is used, the change in direction of the target object can be more easily estimated, thereby the estimation accuracy of the entire shape can be enhanced. As another method of estimating the change in direction of the target object, it is considered to make use of a turntable with a marker (FIG. 14). This method is advantageous in that a rotation angle can be determined by image processing without using a sensor other than the camera and that feature points can be easily extracted.

A method of calculating a rotation angle using the turntable will be described. First, the rotation axis and the rotation plane of the turntable are previously calibrated.

Figure 15:
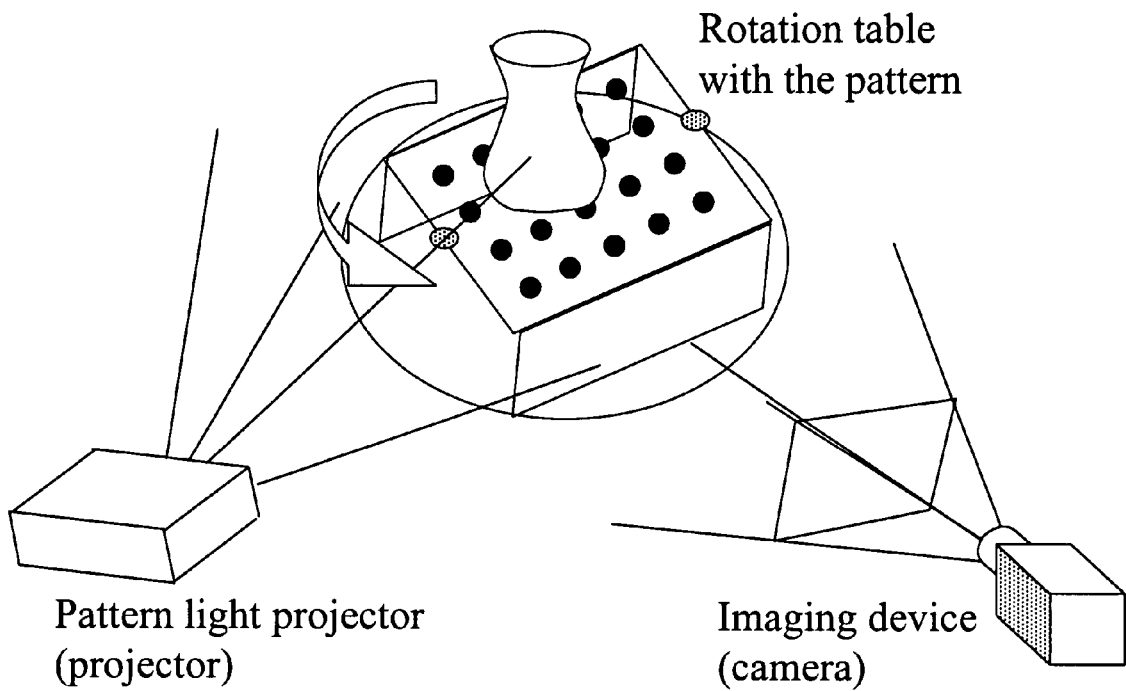
FIG. 15 shows the rotation table with calibration pattern in order to estimate the axis of the rotation table.

When the turntable is turned, an LED mounted on the turntable draws an elliptical shape on a two-dimensional image. Thus, the turn axis can be estimated by analyzing the elliptical shape. To calibrate the turntable, a method of putting a calibration pattern on the turntable, measuring the pattern while turning the turntable, and the turntable can be calibrated by an optimization calculation using the measured patterns (FIG. 15).

Figure 16:
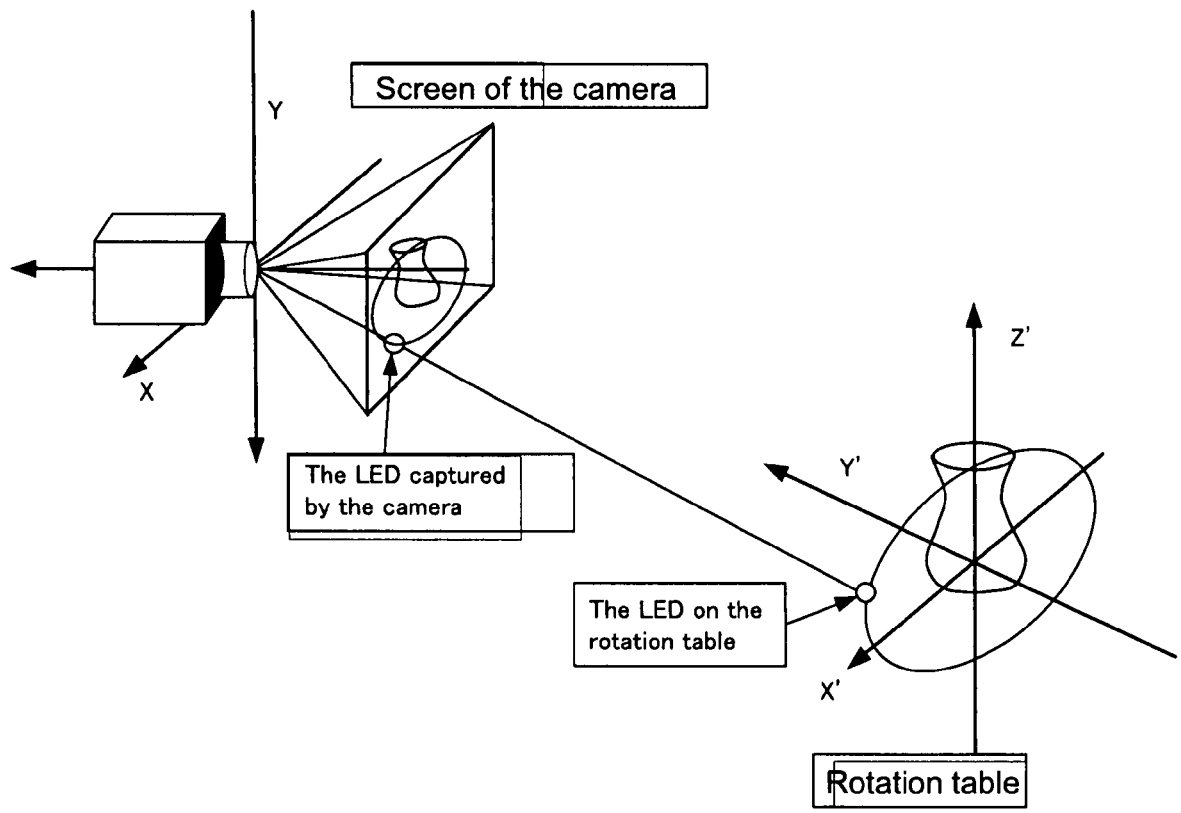
FIG. 16 shows the process of calculating the rotation angle of the rotation table using the location of the marker in the image.

Next, the 3D coordinate of the point, at which a line connecting the center of the camera and the LED on the image plane intersects with the actual LED, is determined. By using the coordinate and the calibration parameter, it is possible to calculate the rotation angle of the turntable and the distance between the LED and the center of rotation (radius of rotation)(FIG. 16).

Figure 17:
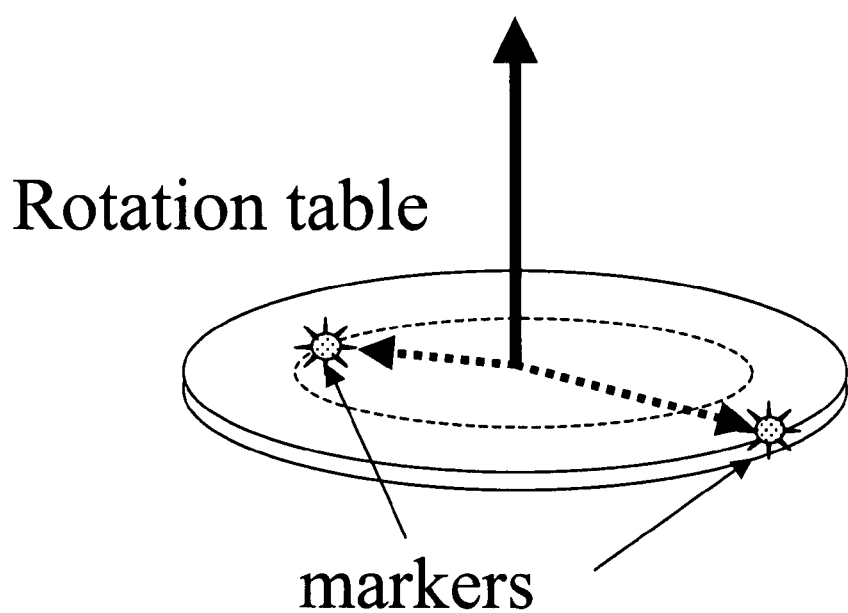
FIG. 17 shows an example of the rotation table with markers which are put on different radii in order to discriminate each markers.

Further, when the target to be measured is placed on the turntable, because the LED occluded by the object cannot be observed, a plurality of LEDs are attached so that any one of them can be observed at all times. At the time, it is preferable to make it possible for the plurality of LEDs to be identified by setting the radii of rotation of them to different values (FIG. 17). To identify the plurality of LEDs, a method of using different colors, a method of changing the size of the LEDs, and the like are also effective in addition to the method of using the different radii of rotation.

Further, a method without previously conducting a calibration is also considered. This method can be realized because the axis of rotation can be easily calculated by applying the condition that the plurality of 3D coordinates of the positions of the LEDs, which are obtained by the present invention while rotating the turntable, are placed on the same plane, and they are also rotated about the same axis of rotation.

Further, as another method that utilizes the LED, it can be used as a switch. When, for example, a video camera is used as the image capturing device, the video camera can easily detect a movement of the LED. Further, the video camera can also detect that the LED is stationary likewise. Accordingly, the LED can be used as the switch by carrying out no measurement when the LED moves, that is, when the turntable moves, and automatically starting the 3D measurement according to the present invention when it detect that the turntable stops. With this arrangement, the user can automatically measure the entire shape of the target object only by placing the target to be measured on the turntable and simply turning the target together with the turntable without the need for operating a personal computer or other equipments.

As described above, according to the present invention, the 3D shape of a target object can be measured from a captured image using the projector and the camera. At the time, the positional relationship between the projector and the camera can be automatically estimated. With this arrangement, workload can be greatly reduced and the knowledge necessary for measurements can be reduced as compared with the conventional similar systems which require the previous calibration of the positional relationship.

Further, when the apparatus in which the laser pointer is attached to the projector is used, the scaling of a target object can be determined. This is important to the creation of a shape model that requires scaling.

Further, difficulties of constructing a construction of the entire shape of a target object can be reduced achieved by measuring the object from a plurality of directions and reconstructing it at the same time. At the time, when the turntable with the LED is used, the entire shape can be automatically reconstructed simply without the need for additional equipments.

The invention claimed is:

1. A measuring method using a pattern projector and an image capturing device having a fixed relative positional relationship to each other, said measuring method comprising:
    emitting a pattern light to a target object by said pattern projector;
    obtaining one or more images by capturing the pattern light by said image capturing device as an input;
    estimating an internal parameter of said pattern projector, an internal parameter of said image capturing device, and a relative positional relationship between said pattern projector and said image capturing device from the pattern of the captured image by using an epipolar constraint of said pattern projector and said image capturing device;
    estimating 3D coordinates representing the surface of said target object by a principle of triangulation using the captured pattern light and the estimated internal parameters of said pattern projector and said image capturing device, and the estimated relative positional relationship therebetween; and
    measuring a 3D shape based on the estimated 3D coordinates representing the surface of said target object and the estimated internal parameters of said pattern projector and said image capturing device and the estimated relative positional relationship therebetween,
    wherein the 3D coordinates of the surface of said target object are estimated without providing a specific assumption as to said pattern projector and said image capturing device and without previously measuring the internal parameters of said pattern projector and said image capturing device and the relative positional relationship therebetween.

2. The method according to claim 1, further comprising:
    receiving input data from a laser beam projected from a light projecting device and captured by said image capturing device and the relative positional relationship between said light projecting device and said pattern projector, said light projecting device being attached to a predetermined position of said pattern projector; and
    determining a scaling-parameter of the estimated 3D coordinates representing the surface of the target object from the set of the estimated 3D coordinates of the target object, said projected and captured laser beam, and said relative positional relationship between said light projecting device and said pattern projector,
    wherein the 3D coordinates of the surface of said target object and the scaling thereof are obtained.

3. The method according to claim 1, further comprising:
fixing one of said pattern projector and said image capturing device;
moving the other of said pattern projector and said image capturing device, wherein the one or more images are captured at respective positions of the other of said pattern projector and said image capturing device, the one or more images captured at each respective position forming an image set;
obtaining one or more image sets as inputs;
estimating the 3D shape for each image set;
transforming a plurality of the estimated 3D shapes to a coordinate system of the fixed one of said pattern projector and said image capturing device;
wherein the estimated 3D shapes are automatically aligned and the scalings of the 3D shapes are made consistent to each other.

4. The method according to claim 3, further comprising:
calculating a sum of differences of a common region of the 3D shapes of the respective image sets as an error, said 3D shapes being represented by the coordinate system of the fixed device; and
correcting the internal parameters of said pattern projector and said image capturing device and the relative positional relationship therebetween by minimizing the error,
wherein the estimation accuracy of the 3D coordinates is improved.

5. The method according to claim 3, further comprising:
calculating a sum of differences of a common region of the 3D shapes of the respective image sets as an error, said 3D shapes being represented by a common coordinate system; and
correcting the internal parameters of said pattern projector and said image capturing device and the relative positional relationship therebetween, and said 3D shapes, by minimizing the error,
wherein the estimation accuracy of the 3D coordinates is improved.

6. The method according to claim 3, further comprising:
calculating a sum of differences between the projected 3D shapes and the detected positions on said image sets as an error, said 3D shapes being represented by a common coordinate system; and
correcting the internal parameters of said pattern projector and said image capturing device and the relative positional relationship therebetween by minimizing the error,
wherein the estimation accuracy of the 3D coordinates is improved.

7. A measuring apparatus comprising:
a pattern projector that emits pattern light to a target object;
an image capturing device that captures the pattern light, the pattern projector and the image capturing device having a fixed relative positional relationship to each other and capturing one or more images based on the captured pattern light; and
a 3D coordinate estimating section that estimates 3D coordinates representing the surface of said target object from the captured image by estimating an internal parameter of said pattern projector, an internal parameter of said image capturing device, and a relative positional relationship between said pattern projector and said image capturing device from the pattern of the captured pattern light by using an epipolar constraint of said pattern projector and said image capturing device, and by estimating 3D coordinates representing the surface of said target object by a principle of triangulation using the captured pattern light and the estimated internal parameters of said pattern projector and said image capturing device and the estimated relative positional relationship therebetween,
wherein the 3D coordinate representing the surface of said target object are estimated without providing a specific assumption as to said pattern projector and said image capturing device and without previously measuring the internal parameters of said pattern projector and said image capturing device and the relative positional relationship therebetween.

8. The measuring apparatus according to claim 7, further comprising:
a light projecting device attached to a predetermined position of said pattern projector, the light projecting device projecting a laser beam;
a light capturing section that captures the laser beam projected from said light projecting device using said image capturing device;
a scaling obtaining section that obtains a scaling of the estimated 3D coordinates representing the surface of said target object from the set of the estimated 3D coordinates of the target object, said projected and captured laser beam, and said relative positional relationship between said light projecting device and said pattern projector,
wherein the 3D coordinates of the surface of said target object and the scaling thereof are obtained.

9. The measuring apparatus according to claim 7, wherein one of said pattern projector and said image capturing device is fixed, and the other of said pattern projector and said image capturing device is movable, and wherein the one or more images are captured at respective positions of the other one of said pattern projector and said image capturing device, the one or more images captured at each respective position forming an image set, the apparatus further comprising:
an image set obtaining section that obtains a plurality of image sets by repeating the image capturing by said image capturing device,
an 3D shape aligning section wherein a plurality of 3D shapes are aligned by estimating the 3D shape for each image set, and transforming a plurality of the estimated 3D shapes to a coordinate system of the fixed one of said pattern projector and said image capturing device,
wherein the estimated 3D shapes are automatically aligned and the scalings of the 3D shapes are made consistent to each other.

10. The measuring apparatus according to claim 9, further comprising:
a 3D coordinate measuring section that measures the 3D coordinates of the respective image sets by calculating a sum of differences of a common region of the 3D coordinates of the respective image sets as an error, said 3D coordinates being represented by the coordinate system of the fixed device and correcting the internal parameters of said pattern projector and said image capturing device and the relative positional relationship therebetween by minimizing the error,
wherein the estimation accuracy of the 3D coordinates is improved.

11. A measuring method using a pattern projector and an image capturing device having a fixed relative positional relationship, the measuring method comprising:
emitting a pattern light to a target object by said pattern projector;

obtaining one or more images by capturing the pattern light by said image capturing device as an input;

determining data representing a direction from said image capturing device to a point on a surface of the target object, to which the pattern light is projected from said pattern projector, and a direction from the projector to the point using the input image;

estimating an internal parameter of said pattern projector, an internal parameter of said image capturing device, and a relative positional relationship between said pattern projector and said image capturing device by solving an epipolar constraint condition as to said pattern projector and said image capturing device using the data; and estimating 3D coordinates representing the surface of said target object by a principle of triangulation using the data and the internal parameters of said pattern projector and said image capturing device and the relative positional relationship therebetween; and measuring a 3D shape based on the estimated 3D coordinates of the surface of said target object and the estimated internal parameters of said pattern projector and said image capturing device and the estimated relative positional relationship therebetween, wherein the 3D coordinates of the surface of said target object are estimated without providing a specific assumption as to said pattern projector and said image capturing device and without previously measuring the internal parameters of said pattern projector and said image capturing device and the relative positional relationship therebetween.

12. A measuring apparatus comprising:
a pattern projector that emits pattern light to a target object;
an image capturing device that captures the pattern light, the pattern projector and the image capturing device having a fixed relative positional relationship;
a 3D coordinate estimating section that estimates the 3D coordinates representing a surface of said target object from the captured pattern light by determining data representing a direction from said image capturing device to a point on the surface of the target object, to which the pattern light is projected from said pattern projector, and a direction from the projector to the point on the surface of the target object using the input image, estimating an internal parameter of said pattern projector, an internal parameter of said image capturing device, and a relative positional relationship between said pattern projector and said image capturing device by solving an epipolar constraint condition as to said pattern projector and said image capturing device using the data, and estimating 3D coordinates representing the surface of said target object by a principle of triangulation using the data and the internal parameters of said pattern projector and said image capturing device and the relative positional relationship therebetween,
wherein the 3D coordinates representing the surface of said target object can be estimated without providing a specific assumption as to said pattern projector and said image capturing device and without previously measuring the internal parameters of said pattern projector and said image capturing device and the relative positional relationship therebetween.

13. A measuring method using a pattern projector and an image capturing device having a fixed relative positional relationship to each other, comprising
emitting a pattern light to a target object by said pattern projector;

obtaining a plurality of image sets as an input, said plurality of image sets being obtained by capturing said image sets a plurality of times while changing a position of said target object;

determining data representing a direction from said image capturing device and said projector to a point on said target object using said image sets as the input when said image sets are captured;

estimating an internal parameter of said pattern projector, an internal parameter of said image capturing device, and a relative positional relationship between said pattern projector and said image capturing device by solving an epipolar constraint condition as to said pattern projector and said image capturing device using the direction data; and estimating 3D coordinates of the surface of said target object corresponding to the respective image sets by a principle of triangulation from the direction data, the estimated internal parameters of said pattern projector and said image capturing device, and the estimated relative positional relationship between said pattern projector and said image capturing device, wherein the 3D coordinates representing the surface of said target object is estimated as to the plurality of positions of said target object, accuracy of the 3D coordinates of the surface of said target object obtained as to each of said plurality of positions can be improved, and scalings are made consistent to each other, without previously measuring the internal parameters of said pattern projector and said image capturing device and the relative positional relationship therebetween.

14. The measuring method according to claim 13, wherein the plurality of image sets are obtained by using different target objects in place of obtaining the image set while moving a single target object.

15. The measuring method according to claim 13, further comprising:
defining a plurality of 3D shapes, each 3D shape based on a set of 3D coordinates from an image set; and
aligning the plurality of 3D shapes to obtain the entire shape of the target object,
wherein an entire shape of the target object, in which scalings are made consistent to each other, is recreated from the plurality of 3D shapes.

16. The measuring method according to claim 13, further comprising:
rotating the target object on a rotation table to change the position of said target object in the input thereof, said rotation table having a marker attached thereto, wherein said marker captured by said image capturing device is used as an input;
estimating an angle of said rotation table from the position of said marker on the captured image; and
transforming a plurality of 3D coordinates estimated at the respective rotation angles to a uniform coordinate system based on the estimated angle of said rotation table,
wherein an entire shape of the target object is automatically recreated without an additional device for estimating the rotation angle.

17. A measuring method according to claim 16, further comprising:
continuously capturing the marker by said image capturing device as captured images;
determining whether the rotation table is stationary or moving based on the captured images; and automatically starting a 3D measurement when the result of the determination indicates that said rotation table is stationary, wherein an entire shape of the target object is obtained automatically when said target object is rotated on the rotation table.

18. A measuring apparatus, comprising:

a pattern projector that emits pattern light to a target object; and an image capturing device that captures an image of the pattern light, said pattern projector and said image capturing device having a fixed relative positional relationship to each other, said image being formed as one image set;

an image set obtaining section that obtains a plurality of image sets by repeating the capturing of the image while changing a position of said target object; and a 3D coordinate estimating section that estimates 3D coordinates representing a surface of said target object from the respective obtained image sets therefrom by determining data of a directions from said image capturing device and said projector to a point on said target object using said image sets as the input when said image sets are captured, estimating an internal parameter of said pattern projector, an internal parameter of said image capturing device, and a relative positional relationship between said pattern projector and said image capturing device by solving an epipolar constraint condition as to said pattern projector and said image capturing device using the direction data, and estimating 3D coordinates representing the surface of said target object corresponding to the respective image sets by a principle of triangulation from the direction data, the estimated internal parameters of said pattern projector and said image capturing device, and the estimated relative positional relationship between said pattern projector and said image capturing device, wherein the 3D coordinates representing the surface of said target object is estimated as to the plurality of positions of said target object, accuracy of the 3D coordinates representing the surface of said target object obtained as to each of said plurality of positions is improved, and scalings is made consistent to each other, without previously measuring the internal parameters of said pattern projector and said image capturing device and the relative positional relationship therebetween.

19. The measuring apparatus according to claim 18, wherein the image sets are obtained while changing target objects in place of obtaining the image sets while moving a single target object.

20. A measuring apparatus according to claim 18, further comprising:

an aligning section that aligns a plurality of 3D coordinates to obtain an entire shape of the target object, in which scalings are made consistent to each other, restored from the plurality of 3D coordinates.

21. The measuring apparatus according to claim 18, further comprising:

a rotation table having a marker attached thereto, a position changing section that changes a position of the target object by rotating the target object on said rotation table;

a capturing section that captures the marker by said image capturing device as a captured image;

an angle estimating section that estimates an angle of said rotation table from the position of said marker on the captured image; and a transforming section that transforms a plurality of 3D coordinates estimated at the respective rotation angles to a uniform coordinate system based on the estimated angle of said rotation table, wherein the entire shape is automatically restored without an additional device estimating the rotation angle.

22. The measuring apparatus according to claim 21, further comprising:

a continuous capturing section that continuously captures the marker by said image capturing device;

a determining section that determines whether the rotation table is stationary or moving based on the captured image; and a 3D measurement starting section that automatically starts a 3D measurement when the result of the determination indicates that said rotation table is stationary, wherein an entire shape of the target object is obtained automatically when said target object is rotated on the rotation table.

* * * * *